(12) United States Patent
Sakai et al.

(10) Patent No.: US 7,932,975 B2
(45) Date of Patent: Apr. 26, 2011

(54) LIQUID CRYSTAL DISPLAY DEVICE

(75) Inventors: Takehiko Sakai, Matsusaka (JP);
Tsuyoshi Okazaki, Nara (JP);
Katsuhiko Morishita, Matsusaka (JP);
Yoshiharu Kataoka, Tsu (JP);
Chikanori Tsukamura, Tsu (JP); Dai Chiba, Matsusaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 206 days.

(21) Appl. No.: 12/303,826

(22) PCT Filed: Jul. 5, 2007

(86) PCT No.: PCT/JP2007/063439
§ 371 (c)(1),
(2), (4) Date: Dec. 8, 2008

(87) PCT Pub. No.: WO2008/029553
PCT Pub. Date: Mar. 13, 2008

(65) Prior Publication Data
US 2010/0110345 A1    May 6, 2010

(30) Foreign Application Priority Data

Sep. 7, 2006 (JP) ................................. 2006-243326

(51) Int. Cl.
*G02F 1/1335* (2006.01)
(52) U.S. Cl. .......................... 349/113; 349/96; 349/117
(58) Field of Classification Search .............. 349/96–98, 349/113–114, 117–119
See application file for complete search history.

(56) References Cited

U.S. PATENT DOCUMENTS

| | | | |
|---|---|---|---|
| 6,433,845 B1 * | 8/2002 | Suzuki et al. | 349/102 |
| 7,230,663 B1 * | 6/2007 | Wu et al. | 349/114 |
| 2004/0252258 A1 | 12/2004 | Matsushima | |
| 2006/0103782 A1 | 5/2006 | Adachi et al. | |
| 2006/0146405 A1 | 7/2006 | Macmaster | |
| 2007/0036917 A1 | 2/2007 | Hirakata | |

FOREIGN PATENT DOCUMENTS

| | | |
|---|---|---|
| EP | 1 679 545 | 7/2006 |
| JP | 10-268251 | 10/1998 |
| JP | 2004-333830 | 11/2004 |
| JP | 2007-047697 | 2/2007 |

OTHER PUBLICATIONS

U.S. Appl. No. 12/674,032, filed Feb. 18, 2010, entitled "Liquid Crystal Display Device".
International Search Report for PCT/JP2007/063439, mailed Oct. 16, 2007.

* cited by examiner

*Primary Examiner* — Dung T. Nguyen
(74) *Attorney, Agent, or Firm* — Nixon & Vanderhye,. P.C.

(57) ABSTRACT

A liquid crystal display device includes a reflective liquid crystal panel (20) having a liquid crystal panel polarization plate (22), a polarization plate (32) provided on a front surface side of the polarization plate (22) with its absorption axis in parallel with an absorption axis of the polarization plate (22), and a negative C plate (31) provided between the liquid crystal panel polarization plate (22) and the polarization plate (32). The negative C plate (31) sets a direction in which viewing limitation is carried out. Thus, it is possible to provide the liquid crystal display device in which a viewing angle can be narrowed by freely setting, in the reflective liquid crystal panel, the direction in which the viewing limitation should be carried out.

23 Claims, 21 Drawing Sheets

FIG. 5 (a) OFF-VOLTAGE
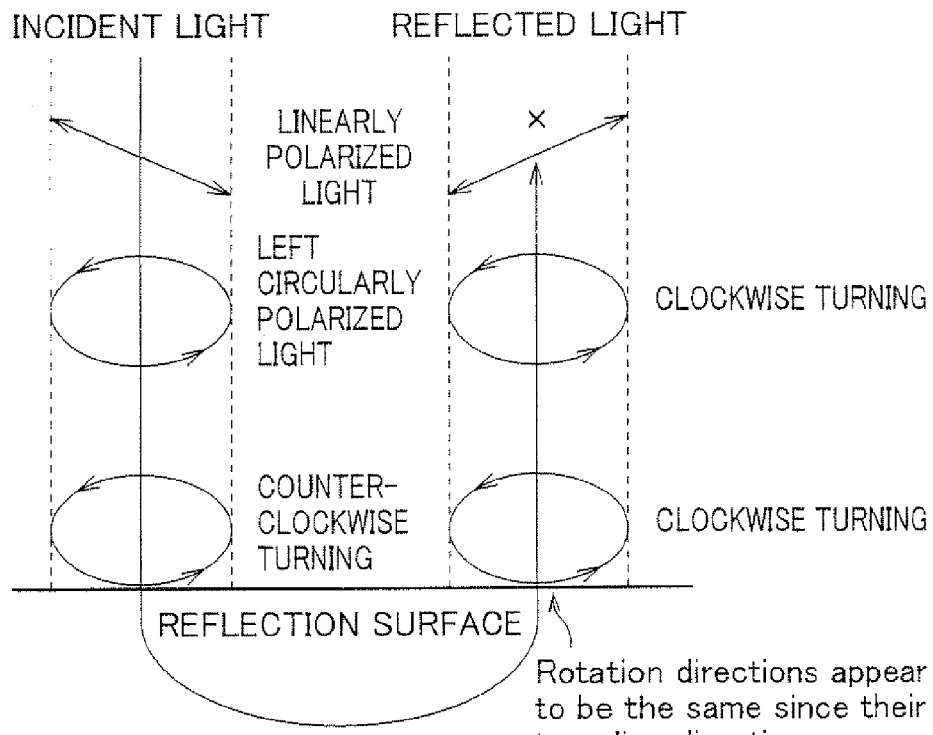
FIG. 5 (b) ON-VOLTAGE
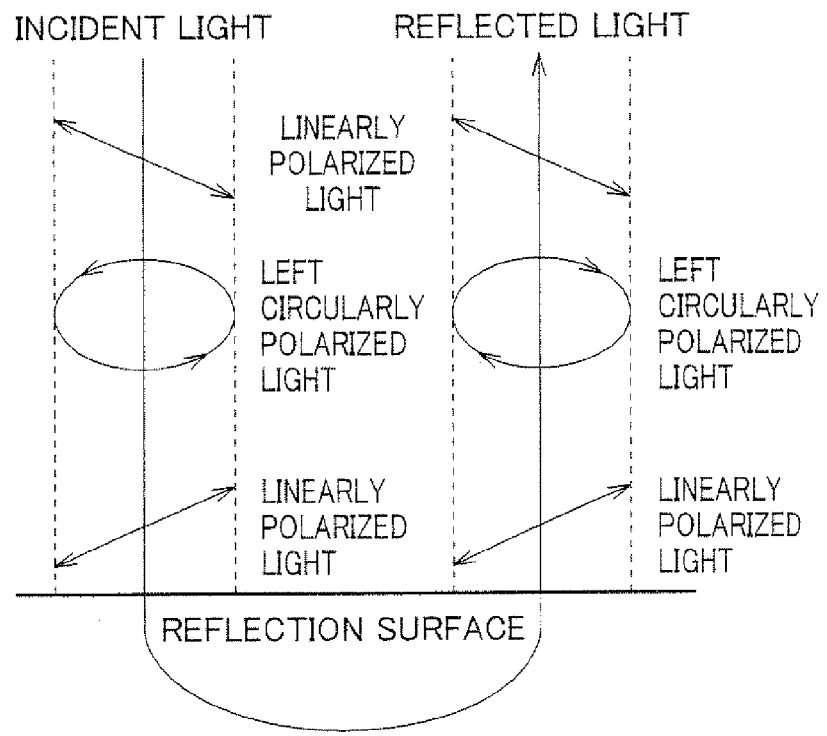

FIG. 7 (a)
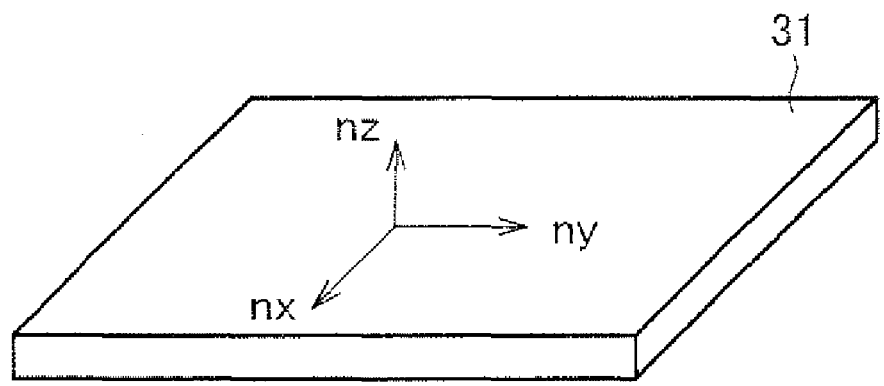
FIG. 7 (b)  nx=ny>nz
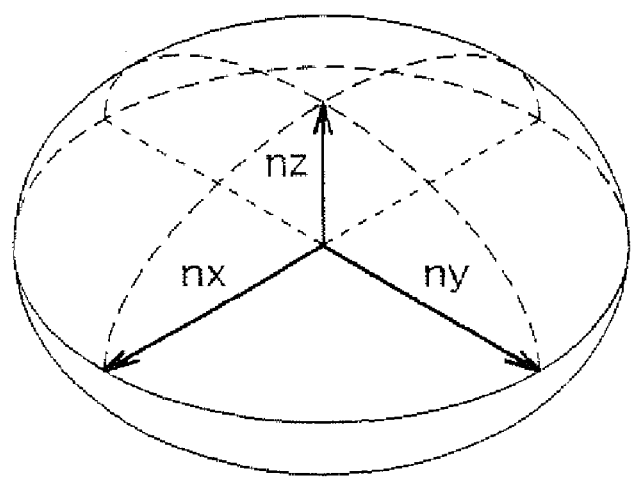

FIG. 15 (a)
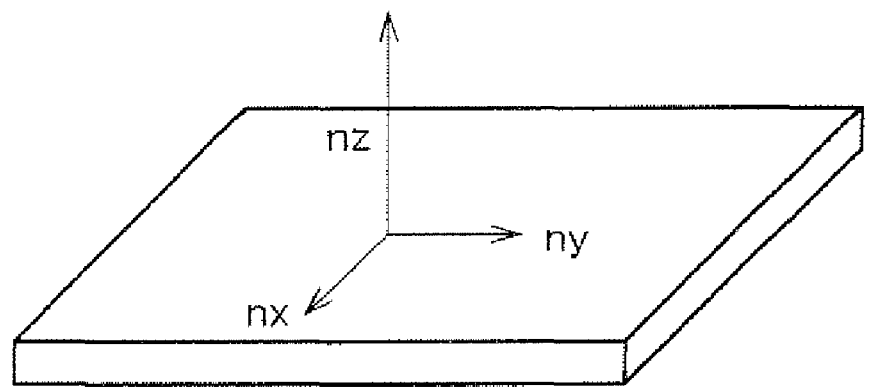
FIG. 15 (b) nx=ny<nz
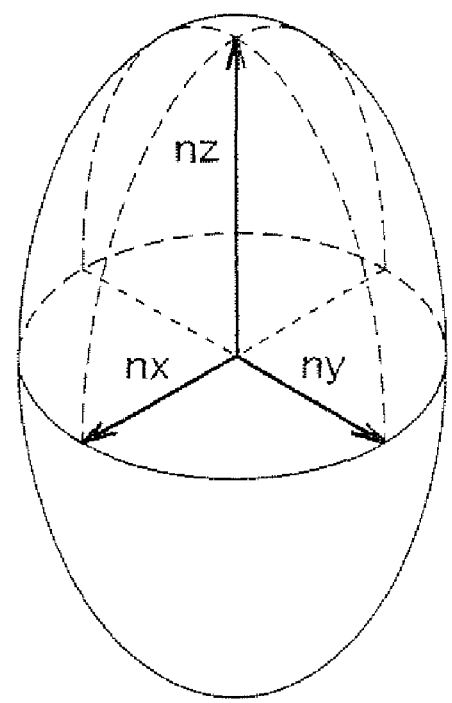

LIQUID CRYSTAL DISPLAY DEVICE

This application is the U.S. national phase of International Application No. PCT/JP2007/063439, filed 5 Jul. 2007, which designated the U.S. and claims priority to Japanese Patent Application No. 2006-243326, filed 7 Sep. 2006, the entire contents of each of which are hereby incorporated by reference.

TECHNICAL FIELD

The present invention relates to a liquid crystal display device for controlling a viewing angle of a display panel.

BACKGROUND ART

Generally, display devices are required to have as wide a viewing angle as possible so that a clear image can be viewed from all viewing angles. In liquid crystal display devices which have been in widespread use, liquid crystal itself has a viewing angle dependency. On this account, in particular, various technological developments have been promoted for making the viewing angle wider.

However, depending on a use environment, there is a case that it is favorable for a display device to have a narrow viewing angle so that only a user can view display contents. An electronic device, such as a laptop type personal computer, a portable information terminal (PDA: Personal Digital Assistant), or a portable phone, in particular, is more likely to be used in a place (e.g., in a train, airplane, etc.) where general public can be present. Under such a use environment, it is desirable that a viewing angle of a display device be narrow because the user does not wish the display contents to be viewed by others near to the user, in view of preservation of confidentiality and/or privacy protection. Thus, the demand has been recently increased for a liquid crystal display device in which the viewing angle can be switched between a wide viewing angle and a narrow viewing angle in accordance with a situation in which the liquid crystal display device is used. Such demand is not limited to liquid crystal display devices. Instead, it is a problem shared by any display devices.

For example, Patent Document 1 (later described) proposes the following technique, in order to meet such a demand. Specifically, the Patent Document 1 discloses a technique in which a retardation control device is provided in addition to a display device for displaying an image. According to the technique, a voltage to be applied to the retardation control device is controlled so that a display device has a change in a viewing angle feature. The Patent Document 1 adopts a liquid crystal display device, serving as the retardation control device, whose liquid crystal is chiral nematic liquid crystal, homogeneous liquid crystal, or randomly aligned nematic liquid crystal, for example.

The Patent Document 1 describes that it is possible to switch the viewing angle between a wide viewing angle and a narrow viewing angle by using the liquid crystal display device for controlling retardation. However, the switching of the viewing angle between the wide viewing angle and the narrow viewing angle is not always necessary.

In a case where the viewing angle can be switched between the wide and the narrow viewing angles in a display device, the display device has a complex arrangement. As such, in view of cost reduction, a display device has been demanded in which viewing angles can be narrowed though not being able to be switched between the wide and narrow viewing angles.

For example, Patent Document 2 (later described) discloses a technique in which a viewing angle is narrowed without being switched between the wide and narrow viewing angles. The Patent Document 2 discloses a viewing field control sheet, which substitutes for the retardation control device capable of switching the viewing angle between the wide and narrow viewing angles. As shown in FIG. 19, a louvered film 102 serving as the viewing field control sheet is stacked on top of a liquid crystal panel 101 that has a liquid crystal cell 111 made of TN liquid crystal. As shown in FIG. 20, the louvered film 102 includes (i) base material sections 121 made of a light transmission material and (ii) light absorption barriers 122 made of a light absorption material and formed in a louvered manner. The light absorption barriers 122, made of the light absorption material, have a refraction index smaller than that of the base material sections 121 made of light transmission material. The louvered film 102 blocks outgoing of light that has an incident angle of a particular angle or more. Thus, it is possible to realize the viewing field control sheet that brings about a peek prevention effect.

The louvered film 102 disclosed in the Patent Document 2 has recently become a mainstream in viewing angle control panels that does not switch a viewing angle between the wide viewing and narrow viewing angles.

(Patent Document 1)
Japanese Unexamined Patent Application Publication, Tokukai-hei, No. H11-174489 (published on Jul. 2, 1999)
(Patent Document 2)
Japanese Unexamined Patent Application Publication, Tokukai, No. 2000-137294 (published on May 16, 2000)

DISCLOSURE OF INVENTION

However, the louvered film disclosed in the Patent Document 2 causes a problem that, when visibility limitation is carried out in diagonal directions, it is not possible to arbitrarily set a direction in which the visibility of the liquid crystal panel should be limited.

The present invention is made in view of the problem, and an object of the present invention is to provide a liquid crystal display device in which a viewing angle can be narrowed by freely setting, in a reflective liquid crystal panel, a direction in which the visibility limitation should be carried out.

In order to attain the object, a liquid crystal display device of the present invention includes: a reflective liquid crystal panel including a liquid crystal panel polarization plate; a polarization plate provided on a light incident side of the liquid crystal panel, with respect to the liquid crystal panel polarization plate; and a retardation member provided between the liquid crystal panel polarization plate and the polarization plate, a retardation of the retardation member in a light path, which light path is occurred when the liquid crystal panel is viewed in a direction at a particular polar angle $\phi k$ ($0°<\phi k<90°$), being set so as to determine a direction in which a visibility limitation should be carried out.

According to the arrangement, the retardation member is provided between the liquid crystal panel polarization plate and the polarization plate. In the retardation member, the retardation is set so that the direction in which the visibility limitation should be carried out is determined.

Linearly polarized light, which has passed through the polarization plate provided on the light incident side of the liquid crystal panel, enters the liquid crystal panel via the retardation member and the liquid crystal panel polarization plate, and is then reflected in the liquid crystal panel. The linearly polarized light thus reflected passes through the liquid crystal panel polarization plate and the retardation member again, and enters the polarization plate on the light incident side of the liquid crystal panel again. At this time, with respect to a light path occurred when the liquid crystal display panel is viewed in a direction at a particular polar angle φk (0°<φk<90°), the retardation member functions to prevent the light having returned to the polarization plate from being gone out from there.

For example, in a case where retardation is set so that the retardation member causes a phase difference of λ/4 with respect to one way of a light path occurred when the liquid crystal display device is viewed in a direction at a particular polar angle φk, an amount of the light directed from the polarization plate on the light incident side to the viewer can be significantly reduced.

The following description provides a detailed reason for the above. First, the linearly polarized light diagonally enters, at a particular polar angle of φk, the retardation member via the polarization plate on the light incident side. Then, the linearly polarized light is converted into circularly polarized light by the retardation member, and enters the liquid crystal panel polarization plate. The liquid crystal panel polarization plate generates linearly polarized light having a light amount which is less by $1/\sqrt{2}$ than that of the circularly polarized light. Next, light reflected in the liquid crystal panel returns to the liquid crystal panel polarization plate. This causes the light to be converted into linearly polarized light by the liquid crystal polarization plate, and causes the linearly polarized light to enter the retardation member. Then, the linearly polarized light having entered the retardation member is converted into circularly polarized light by the retardation member, and then returns to the polarization plate on the light incident side. The polarization plate on the light incident side converts the circularly polarized light into linearly polarized light. The linearly polarized light is then directed toward the viewer, which linearly polarized light is caused by the polarization plate on the light incident side to have a light amount of less by $1/\sqrt{2}$ than that of the circularly polarized light.

In the end, in a case where a transmittance of the polarization plate on the light incident side, which transmittance is obtained when the natural light is converted into the linearly polarized light, is ignored, a light amount of the light having entered the liquid crystal display device of the present invention at the particular polar angle φk is decreased to $(1/\sqrt{2} \times 1/\sqrt{2})=\frac{1}{2}$. In practice, the above transmittance of the polarization plate on the light incident side is of several tens of percent. As such, the above light amount is further decreased. This allows the visibility limitation to be secured effectively.

The present invention is not limited to the arrangement in which the retardation member causes the phase difference of λ/4. Instead, for example, the present invention can include an arrangement in which an absorption axis of a liquid crystal polarization plate and that of a polarization plate on a light incident side are parallel to each other (i.e. the above absorption axes are arranged in parallel Nicols). In this case, retardation may be set so that, with respect to one way of a light path occurred when the liquid crystal display panel is viewed in a direction at a particular polar angle φk, the retardation member causes a phase difference of λ/2.

In this case, the retardation member rotates, by 90°, a polarized wave surface of linearly polarized light entering the retardation member via the polarization plate on the light incident side at the particular polar angle φk. As such, the linearly polarized light having entered the retardation member cannot pass through the absorption axis of the liquid crystal panel polarization plate, thereby not being able to enter the liquid crystal panel. According to such an effect, it is equally possible to carry out the viewing limitation.

Furthermore, the present invention can include an arrangement in which an absorption axis of the liquid crystal panel polarization plate and that of the polarization plate on the light incident side are orthogonal to each other (the above absorption axes are arranged in cross Nicols). In this case, retardation may be set so that, with respect to one way of a light path occurred when the liquid crystal display panel is viewed in a direction at a particular polar angle φk, the retardation member causes a phase difference of λ/4. This brings about the same effect as described above. As such, it is possible to carry out the visibility limitation.

However, note that, in this case, it is preferable to set retardation of the retardation member as follows with respect to the normal direction of the liquid crystal panel, in order that the visibility in the front direction of the viewer is secured. That is, it is preferable to set the retardation so that, while linearly polarized light having vertically entered the polarization plate on the light incident side is passing through the retardation member, the retardation member rotates, by 90°, a polarized wave surface of the linearly polarized light. The linearly polarized light then passes through the liquid crystal panel polarization plate, and enters the liquid crystal panel. In this case, there is no visibility limitation in the front direction of the viewer.

As is clear from the above, the retardation of the retardation member is set so that the visibility limitation is carried out with respect to the direction at the particular polar angle φk. This makes it possible to carry out the viewing limitation in the direction at the particular polar angle φk. As such, a display on the liquid crystal panel cannot be viewed in the direction at the particular polar angle φk. It is therefore possible to narrow the viewing angle.

In the reflective liquid crystal panel, the direction in which the visibility limitation should be carried out can be set freely in accordance with the free designing of the retardation of the retardation member. As a result, it is possible to provide the liquid crystal display device in which the viewing angle can be narrowed by freely setting, in the reflective liquid crystal panel, a direction in which the visibility limitation should be carried out.

In the liquid crystal display device of the present invention, it is preferable that the retardation member include a first retardation plate whose three main refraction indexes nx, ny, and nz satisfy a relation of nx=ny>nz or nx=ny<nz, where the main refraction indexes nx, ny, and nz are main refraction indexes in directions of axes x, y, and z that are orthogonal to each other.

Furthermore, in the liquid crystal display device, it is preferable that the absorption axes of the polarization plate and the liquid crystal panel polarization plate be parallel to an x-y plane correlative to the main refraction indexes nx and ny of the first retardation plate.

Since the first retardation plate satisfies the relation of nx=ny, the retardation member does not have optical anisotropy with respect to light that travels along a direction of the axis z. As such, there is no visibility limitation when the viewer views the liquid crystal panel in the direction of the axis z, i.e., in a front direction.

On the other hand, the retardation member has optical anisotropy with respect to light that travels along a direction at a particular polar angle φk (0°<φk<90°). As such, it is possible to carry out the visibility limitation in accordance with the designing of the retardation, as described above.

A first retardation plate may satisfy the relation of nx=ny>nz. In this case, when main refraction indexes nx, ny, and nz are subjected to a three-dimensional display, the main refraction indexes appear to be a spheroid having a humilis shape in its height direction. Also, a first retardation plate may satisfy the relation of nx=ny<nz. In this case, when the main refraction indexes nx, ny, and nz are subjected to the three-dimensional display, the main refraction indexes appear to be a spheroid looking like an egg standing on end. In an either case of the spheroid, when the liquid crystal panel is viewed in a direction at the set polar angle φk (0°<φk<90°), an equal luminance display is carried out except in some azimuths, thereby causing no adverse effect on the display content, such as distortion. Namely, this allows the visibility limitation to be carried out when the liquid crystal display device is viewed in the direction at the set polar angle φk (0°<φk<90°), i.e., in the diagonal direction, while it is secured that there is no azimuth dependency in visibility in a diagonal direction.

In order for a phase difference to become, for example, λ/4 in one way of a light path occurred when the liquid crystal panel is viewed in a direction at a set polar angle φk (0°<φk<90°), (i) a thickness of the first retardation plate and (ii) a ratio between the main refraction indexes nx (or ny) and nz of the first retardation plate should be set such that, when the liquid crystal panel is viewed in the direction at the particular polar angle φk, a phase difference of λ/2 is generated in a light path via which light entering the first retardation plate is reflected by the liquid crystal panel, passes through the first retardation plate again, and is gone out from the first retardation plate.

In the liquid crystal display device of the present invention, it is preferable that the polarization plate have the absorption axis parallel to that of the liquid crystal panel polarization plate.

In this case, it is possible to maximize an amount of the light entering the liquid crystal panel via the polarization plate and the liquid crystal panel polarization plate. Furthermore, in a case where the retardation member gives, with respect to linearly polarized light passing through the transmission axis of the polarization plate orthogonal to the absorption axis of the polarization plate, a phase difference of approximately λ/2 in a light path via which the linearly polarized light enters and goes out from the retardation member, the circularly polarized light is returned to the polarization plate, as described above. This allows the visibility limitation to be carried out. Also, in a case where the retardation member gives the phase difference of approximately λ/2 to the linearly polarized light in one way of the light path via which the linearly polarized light enters and goes out from the retardation member, it is possible to carry out the visibility limitation, as described above. As such, it is easier to set retardation of the retardation member that gives (i) the phase difference of approximately λ/2 in the light path via which the light enters and goes out from the retardation member or (ii) the phase difference of approximately λ/2 in one way of the light path, such that the visibility limitation is carried out in the light path occurred when the liquid crystal panel is viewed in the direction at the particular polar angle φk.

In the liquid crystal display device of the present invention, the retardation member may include a λ/2 plate, in addition to the first retardation plate satisfying the relation of nx=ny, and the polarization plate may include an absorption axis orthogonal to that of the liquid crystal panel polarization plate.

By the λ/2 plate, while the light having vertically entered the polarization plate on the light incident side is passing through the retardation member, the retardation member rotates, by 90°, the polarized wave surface of the light, as described above. Then, the linearly polarized light passes through the transmission axis of the liquid crystal panel polarization plate, thereby being able to enter the liquid crystal panel. Thus, in this case, it is equally possible to maximize the amount of the light entering the liquid crystal panel via the polarization plate and the liquid crystal panel polarization plate.

In this case, the retardation, to which the retardations of the first retardation plate and the λ/2 plate amount, is set so that the phase difference as described earlier is caused. This equally allows the visibility limitation to be carried out in the light path occurred when the liquid crystal device is viewed in the direction at the particular polar angle φk.

In the liquid crystal display device of the present invention, it is preferable that the first retardation plate be made up of a plurality of retardation plates.

Furthermore, in the liquid crystal display device of the present invention, it is preferable that the plurality of the retardation plates, constituting the first retardation plate, cause a phase difference of λ/4 in their entirety with respect to one way of a light path occurred when the liquid crystal panel is viewed in a direction at a set single constant polar angle φk (0°<φk<90°).

Furthermore, in the liquid crystal display device of the present invention, it is preferable that (i) constant polar angles φk (0°<φk<90°), which are different from each other, be set to the plurality of the retardation plates constituting the first retardation plate, respectively, and (ii) the retardation plates cause phase differences of λ/4, respectively, with respect to one ways of light paths occurred when the liquid crystal panel is viewed in directions at the polar angles φk (0°<φk<90°).

As such, it is possible to bring about two types of effects by the first retardation plate made up of the plurality of the retardation plates.

One of the two types of the effects is that it is possible to set a phase difference so that the plurality of the retardation plates can have the phase difference of λ/4 in their entirety with respect to one way of a light path occurred when the liquid crystal panel is viewed in a direction at a set single constant polar angle φk (0°<φk<90°). This allows the plurality of retardation plates to cause the phase difference of λ/4 in their entirety in one way of the light path, in a case where a single retardation plate alone cannot cause such a phase difference of λ/4 in one way of the light path occurred when the liquid crystal panel is viewed in the direction at the constant polar angle φk (0°<φk<90°).

The other one of the two types of the effects is that it is possible to (i) set constant polar angles φk (0°<φk<90°), which are different from each other, for a plurality of retardation plates, respectively, and (ii) set phase differences so that the retardation plates have their phase differences of λ/4, respectively, with respect to one ways of light paths occurred when the liquid crystal panel is viewed in directions at the set polar angles φk. This allows the visibility limitation to be carried out with respect to the plurality of the polar angles φk. Thus, it is possible to carry out control so that the visibility of the liquid crystal panel is limited in a diagonal direction over a wide range.

In the liquid crystal display device of the present invention, it is preferable that: the retardation member be made of a second retardation plate whose three main refraction indexes nx, ny, and nz satisfy a relation of nx=ny<nz, where the main refraction indexes nx, ny, and nz are refraction indexes in directions of axes x, y, and z that are orthogonal to each other; and the second retardation plate causes a phase difference of λ/4 with respect to one way of a light path occurred when the liquid crystal panel is viewed in a direction at a set polar angle φk (0°<φk<90°).

The second retardation plate has the main refraction indexes satisfy the relation of nx=ny<nz. As such, when the main refraction indexes nx, ny, and nz are subjected to the three-dimensional display, the main refraction indexes appear to be an spheroid looking like an egg standing on end. Thus, when the liquid crystal panel is viewed in a direction at a set polar angle φk (0°<φk<90°), an equal luminance display is carried out except in some azimuths, thereby causing no adverse effect on the display content, such as distortion.

According to the present invention, while the visibility in a diagonal direction is being secured, a phase difference in one way of a light path is equal to λ/4 when the liquid crystal panel is viewed in a direction at the set polar angle φk (0°<φk<90°). As such, the phase differences of λ/4 occurred on approach and return routes of the light path amount to λ/2. Thus, the visibility is limited when the liquid crystal panel is viewed diagonally, i.e., when the liquid crystal panel is viewed in the direction at the set polar angle φk (0°<φk<90°).

Furthermore, in order for the phase difference to become λ/4 in one way of the light path occurred when the liquid crystal panel is viewed in the direction at the set polar angle φk (0°<φk<90°), (i) a thickness of the second retardation plate and (ii) a ratio between the main refraction indexes nx (or ny) and nz of the second retardation plate should be set such that, when the liquid crystal panel is viewed at the particular polar angle φk, a phase difference of λ/2 is generated in a light path via which light entering the second retardation plate is reflected in the liquid crystal panel, passes through the second retardation plate again, and is gone out from the second retardation plate.

Furthermore, in the liquid crystal display device of the present invention, it is preferable that the second retardation plate be made up of a plurality of retardation plates.

Furthermore, in the liquid crystal display device of the present invention, it is preferable that a plurality of retardation plates, constituting the second retardation plate, cause a phase difference of λ/4 in their entirety with respect to one way of a light path occurred when the liquid crystal panel is viewed in a direction at a set single constant polar angle φk (0°<φk<90°).

Furthermore, in the liquid crystal display device of the present invention, it is preferable that (i) constant polar angles φk (0°<φk<90°), which are different from each other, be set to a plurality of retardation plates constituting the second retardation plate, respectively, and (ii) the retardation plates cause phase differences of λ/4, respectively, with respect to one ways of light paths occurred when the liquid crystal panel is viewed in directions at the polar angles φk (0°<φk<90°).

As such, it is possible to bring about two types of effects by the second retardation plate made up of the plurality of the retardation plates.

One of the two types of the effects is that it is possible to set a phase difference so that the plurality of the retardation plates can have a phase difference of λ/4 in their entirety with respect to one way of a light path occurred when the liquid crystal panel is viewed in a direction at a set single constant polar angle φk (0°<φk<90°). This allows the plurality of retardation plates to cause the phase difference of λ/4 in their entirety with respect to one way of the light path, in a case where a single retardation plate alone cannot cause such a phase difference of λ/4 with respect to one way of the light path when the liquid crystal panel is viewed in the direction at the constant polar angle φk (0°<φk<90°).

The other one of the two types of the effects is that it is possible to (i) set constant polar angles φk (0°<φk<90°), which are different from each other, for a plurality of retardation plates, respectively, and (ii) set phase differences so that the retardation plates have their phase differences of λ/4, respectively, with respect to one ways of light paths occurred when the liquid crystal panel is viewed in directions at the set polar angles φk. This allows the visibility limitation to be carried out with respect to the plurality of the polar angles φk. Thus, it is possible to carry out control so that the visibility of the liquid crystal panel is limited in a diagonal direction over a wide range.

Furthermore, in the liquid crystal display device of the present invention, it is preferable that: the retardation member be made up of a third retardation plate whose three main refraction indexes nx, ny, and nz satisfy a relation of (i) nx>ny=nz, (ii) nz=nx>ny, (iii) nx>ny>nz, (iv) nx>nz>ny, or (v) nz>nx>ny, where the refraction indexes nx, ny, and nz are refraction indexes in directions of axes x, y, and z that are orthogonal to each other; and the third retardation plate be provided so that any one of the axes x and y is parallel to the absorption axis of the polarization plate, the third retardation plate causing a phase difference of λ/4 with respect to one way of a light path occurred when the liquid crystal panel is viewed in a direction at a set polar angle φk (0°<φk<90°).

That is, even in a case where a third retardation plate has main refraction indexes nx and ny that are not equal to each other, no phase difference is caused in a plane parallel to a display surface if the third retardation plate is arranged such that any one of the axis directions x and y is parallel to the absorption axis of the polarization plate. Thus, besides the positive A plate (nx>ny=nz), the negative A plate (nz=nx>ny), or the X plate (nx>ny>nz), any plate that meets the above requirements can be used as the third plate.

Furthermore, in the liquid crystal display device of the present invention, it is preferable that the third retardation plate be made up of a plurality of retardation plates.

Furthermore, in the liquid crystal display device of the present invention, it is preferable that a plurality of retardation plates, constituting the third retardation plate, cause a phase difference of λ/4, in their entirety, with respect to one way of a light path occurred when the liquid crystal panel is viewed in a direction at a set single constant polar angle φk (0°<φk<90°).

Furthermore, in the liquid crystal display device of the present invention, it is preferable that (i) constant polar angles φk (0°<φk<90°), which are different from each other, be set to a plurality of retardation plates constituting the third retardation plate, respectively, and (ii) the retardation plates cause phase differences of λ/4, respectively, with respect to one ways of light paths occurred when the liquid crystal panel is viewed in directions at the polar angles φk.

That is, it is possible to bring about two types of effect by the third retardation plate made up of the plurality of the retardation plates.

One of the two types of the effects is that it is possible to set a phase difference so that the plurality of the retardation plates can have a phase difference of λ/4 in their entirety in one way of light path occurred when the liquid crystal panel is viewed in a direction at a set single constant polar angle φk (0°<φk<90°). This allows the plurality of retardation plates to cause the phase difference of λ/4 in their entirety with respect to one way of the light path, in a case where a single retardation plate alone cannot cause such a phase difference of λ/4 with respect to one way of the light path occurred when the liquid crystal panel is viewed in the direction at the constant polar angle φk (0°<φk<90°).

The other one of the two types of the effects is that it is possible to (i) set constant polar angles φk (0°<φk<90°), which are different from each other, for the retardation plates, respectively, and (ii) set phase differences so that the retardation plates have their phase differences of λ/4, respectively, in one ways of light paths occurred when the liquid crystal panel is viewed in directions at the polar angles φk. This allows the visibility limitation to be carried out with respect to the plurality of the polar angles φk. Thus, it is possible to carry out control so that the visibility of the liquid crystal panel is limited in a diagonal direction over a wide range.

Each of the limitations to the liquid crystal display device can be combined arbitrarily. This also makes it possible to attain the object of the present invention.

For a fuller understanding of the nature and advantages of the invention, reference should be made to the ensuing detailed description taken in conjunction with the accompanying drawings.

BRIEF DESCRIPTION OF DRAWINGS

FIG. 5(a) shows a polarization property obtained when a voltage to the liquid crystal panel is not applied FIG. 5(b) shows a polarization property obtained when a voltage to the liquid crystal panel is applied.

FIG. 7(a) shows a relation of three main refraction indexes nx, ny, and nz of a negative C plate.

FIG. 7(b) shows by an index spheroid, the relation of the main refraction indexes nx, ny, and nz.

FIG. 15(a) shows a relation of three main refraction indexes nx, ny, and nz of a positive C plate.

FIG. 15(b) shows by an index ellipsoid, the relation of the main refraction indexes nx, ny, and nz.

FIG. 18(a) corresponds to a case in which the retardation plate is a positive A plate. FIG. 18(b) corresponds to a case in which the retardation plate is a negative A plate. FIG. 18(c) corresponds to a case in which the retardation plate is an X plate. FIGS. 18(d) and 18(e) correspond to a case in which the retardation plate is another third retardation plate.

BRIEF DESCRIPTION OF REFERENCE NUMERALS

Figure 1:
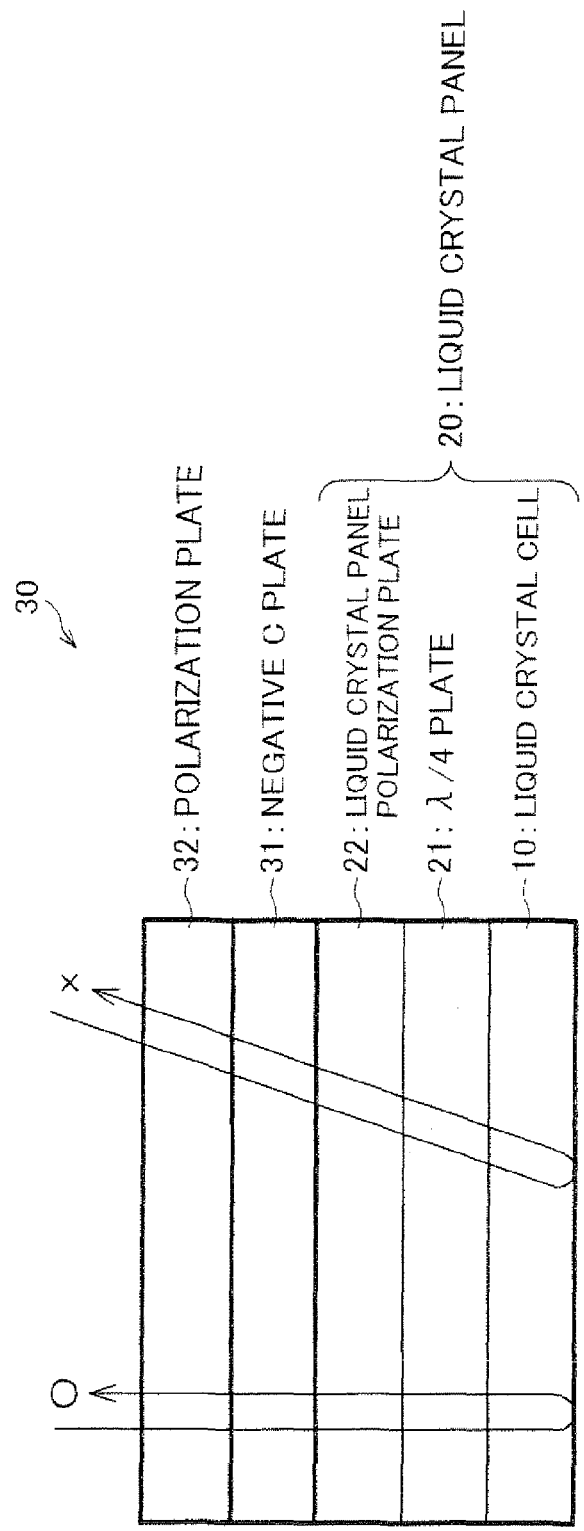
FIG. 1 is a cross-sectional view of an arrangement of a liquid crystal display device, schematically showing the liquid crystal display device of one embodiment in accordance with the present invention.

8. Reflection electrode
10. Liquid crystal cell
20. Liquid crystal panel
21. λ/4 plate
22. Liquid crystal panel polarization plate
30. Liquid crystal display device
30a. Liquid crystal display device
30b. Liquid crystal display device
31. Negative C plate (retardation member, first retardation plate)
31a. First negative C plate (first retardation plate)
31b. Second negative C plate (second retardation plate)
32. Polarization plate
33. λ/2 plate (retardation member)
40. Liquid crystal display device
41. Positive C plate (retardation member, second retardation plate)

BEST MODE FOR CARRYING OUT THE INVENTION

Embodiment 1

One embodiment of the present invention is described as follows, with reference to FIGS. 1 through 13. For convenience of an explanation, the drawings referred below simplify and show only main members, of members constituting one embodiment of the present invention, that are necessary for explaining the present invention. As such, a liquid crystal display device of the present invention can include any component member that is not shown in the drawings referred in the present description. Besides, dimensions of the members in the drawings do not accurately represent actual dimensions of the constituting members or their dimensional ratios.

First, with reference to FIG. 1, the following description deals with how a liquid crystal display device 30 of the present embodiment is arranged. FIG. 1 is a cross-sectional view for schematically showing the arrangement of the liquid crystal display device 30.

The liquid crystal display device 30 is a reflective liquid crystal display device. As shown in FIG. 1, the liquid crystal display device 30 includes a liquid crystal panel 20 on which a negative C plate 31 and a polarization plate 32 are stacked in this order. The negative C plate 31 serves as a retardation member as well as a first retardation plate. The liquid crystal panel 20 includes a liquid crystal cell 10, a λ/4 plate 21 for optical compensation, and a liquid crystal panel polarization plate 22. A transmission axis of the liquid crystal panel polarization plate 22 is parallel to that of the polarization plate 32.

Figure 2:
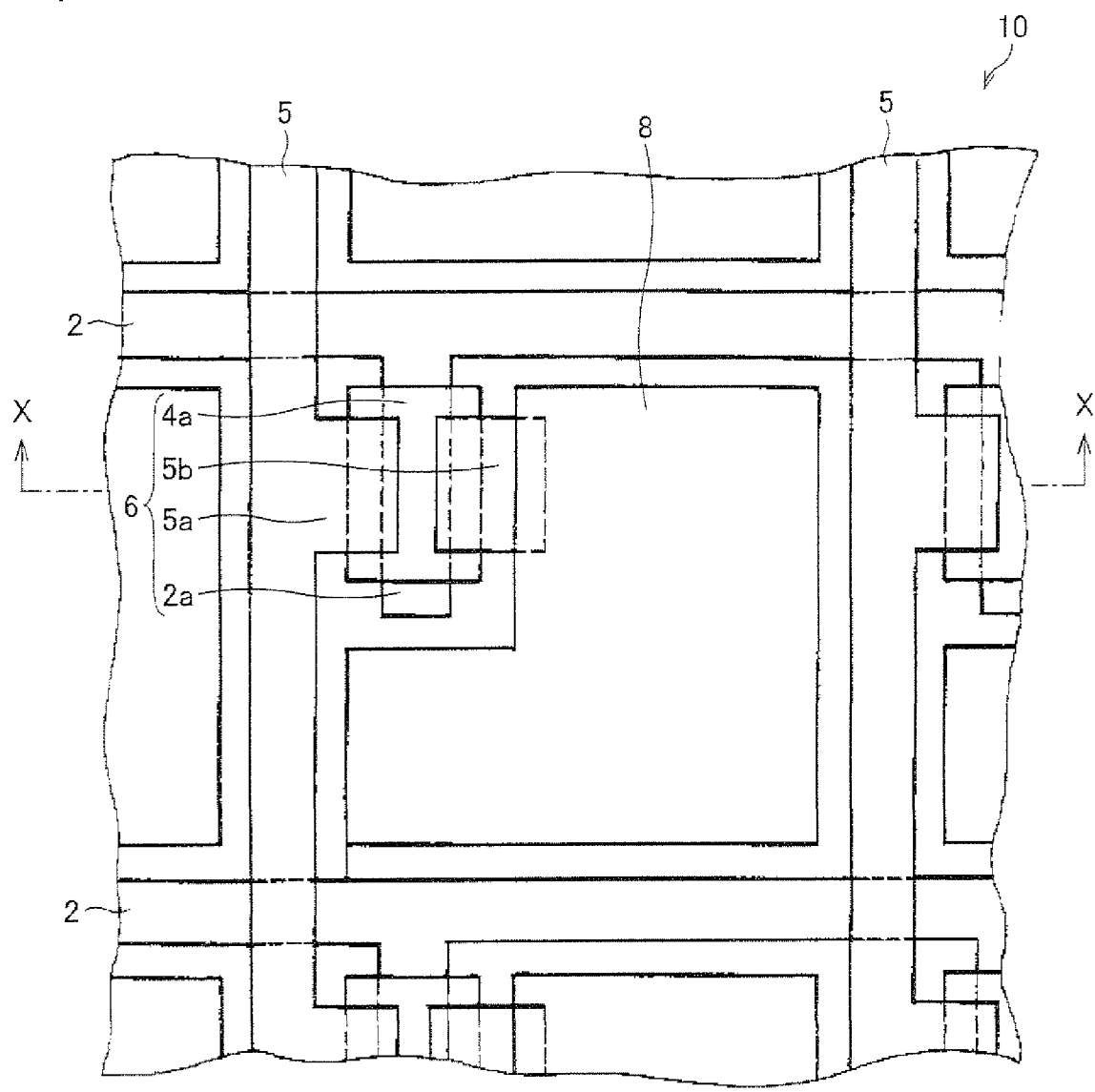
FIG. 2 is a plan view for showing a main arrangement of a liquid crystal cell constituting the liquid crystal display device.
Figure 3:
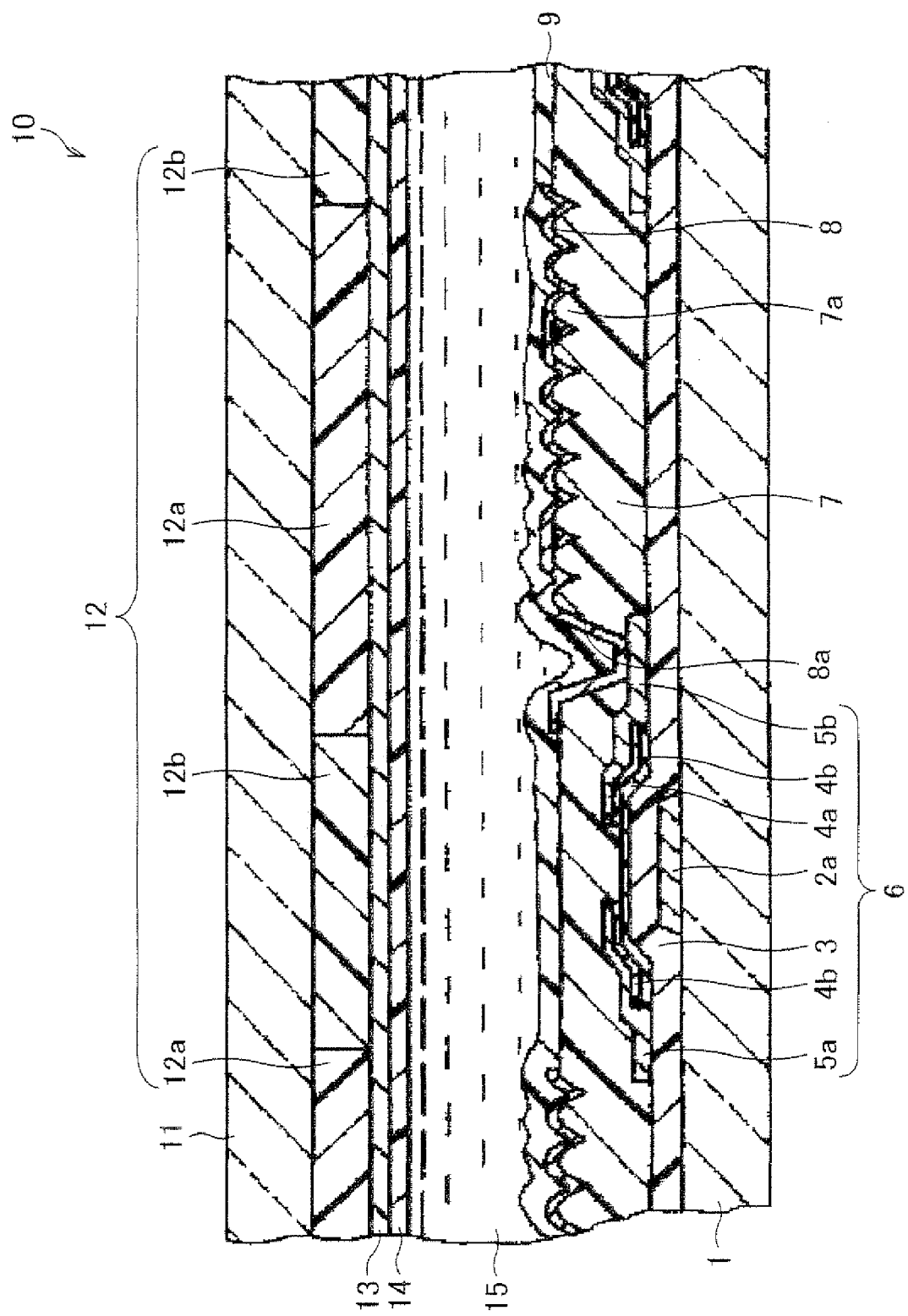
FIG. 3 is a cross-sectional view for showing the main arrangement of the liquid crystal cell.

An arrangement of the liquid crystal cell 10 is described with reference to FIGS. 2 and 3. FIG. 2 is a plan view showing the arrangement of the liquid crystal cell 10. FIG. 3 is a cross-sectional view taken on a line X-X in FIG. 2.

As shown in FIGS. 2 and 3, the liquid crystal cell 10 includes a plurality of gate bus lines 2 made of a material such as chrome (Cr) or tantalum (Ta), on an insulating substrate 1 made of a material such as glass. The gate bus lines 2 are provided parallel to each other, and gate electrodes 2a diverge from the gate bus lines 2. The gate bus lines 2 serve as scanning lines, respectively.

On an entire surface of the substrate 1, a gate insulation film 3 made of a material such as silicon nitride (SiNx) or oxide silicon (SiOx) is formed so as to cover the gate electrodes 2a. On the gate insulation film 3, i.e., above the gate electrodes 2a, a semiconductor layer 4a made of a material such as amorphous silicon, polycrystalline silicon, or CdSe is formed. At both ends of the semiconductor layer 4a, contact electrodes 4b made of a material such as amorphous silicon are formed. On one of the contact electrodes 4b, a source electrode 5a made of a material such as titanium, molybdic, or aluminum is provided. Like the source electrode 5a, a drain electrode 5b made of a material such as titanium, molybdic, or aluminum is provided on the other one of the contact electrode 4b.

As shown in FIG. 2, the source electrode 5a is connected to a source bus line 5 that serves as a signal line. The source bus line 5 intersects with a gate bus line 2 via the gate insulation film 3. The source bus line 5 is made of the same metal as the source electrode 5a. A TFT 6 is made up of the gate electrode 2a, the gate insulation film 3, the semiconductor layer 4a, the source electrode 5a, and the drain electrode 5b. The TFT 6 has a function of a switching element.

On the entire surface of the substrate 1, an organic insulation film 7 is formed so as to cover gate bus lines 2, source bus lines 5, and TFTs 6. In a region of the organic insulation film 7 where a reflection electrode 8 is formed, a convex section 7a is provided. The convex section 7a has a taper shape, and its head part has a doughnut-shaped or a circular cross section. In a region of the organic insulation film 7 where a drain electrode 5b is formed, a contact hole 8a is provided.

On the region where the convex section 7a having the doughnut-shaped or circular cross section is provided, the reflection electrode 8 made of a material such as aluminum (Al) or silver (Ag) is formed. The reflection electrode 8 is connected to the drain electrode 5b via a contact hole 8a. On the reflection electrodes 8, an alignment film 9 is further formed.

On the other substrate 11, a color filter 12 is formed. The color filter 12 includes (i) a magenta or green filter 12a in a region where the substrate 11 faces a reflection electrode 8, and (ii) a black filter 12b in a region where the substrate 11 does not face the reflection electrode 8. On an entire surface of the color filter 12, a transparent counter electrode 13 made of a material such as ITO (Indium Tin Oxide) is formed. On the counter electrode 13, an alignment film 14 is further formed.

The substrate 1 and the counter substrate 14 are combined to face each other so that the reflection electrode 8 and the magenta or green filter 12a correspond to each other. Liquid crystal 15 is filled in between the substrate 1 and the counter substrate 11.

Since it is necessary, in the liquid crystal cell 10, for the liquid crystal to be driven by a display unit such as a pixel unit or a segment unit, the liquid crystal cell 10 has an electrode structure corresponding to the display unit.

In the present embodiment, the liquid crystal cell 10 of the liquid crystal panel 20 has a display mode of, for example, a VA (Vertical Alignment) mode. However, the present embodiment is not necessarily limited to this. Alternatively, the liquid crystal cell 10 can have a TN (Twisted Nematic) liquid crystal mode that uses positive nematic liquid crystal having twisted alignment or other display modes. Besides, the liquid crystal cells 10 can be any liquid crystal cells capable of displaying a character, image, or moving image. Furthermore, in the present invention, the liquid crystal cell 10 can be a liquid crystal cell capable of carrying out a color display or a liquid crystal cell for exclusively carrying out a monochrome display.

Figure 4:
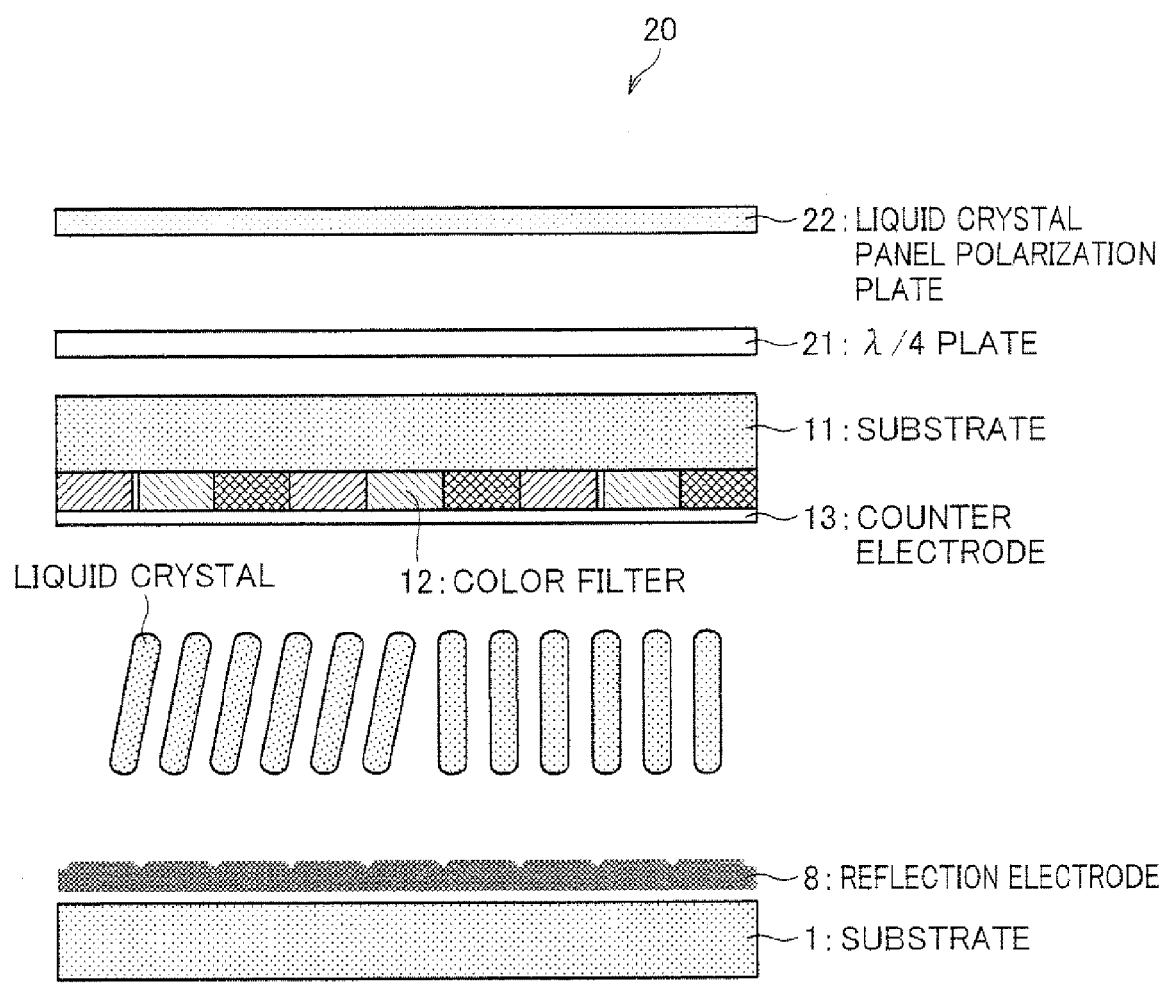
FIG. 4 is a cross-sectional view for showing an arrangement of a liquid crystal panel of the liquid crystal display device.

With reference to FIGS. 4, 5(a), and 5(b), the following description deals with a display principle of the reflective liquid crystal panel 20 having the above arrangement. FIG. 4 is a cross-sectional view showing an arrangement of the liquid crystal panel 20. FIG. 5(a) shows a pathway and a polarization state of outside light that are obtained when no voltage is applied. FIG. 5(b) shows a pathway and a polarization state of outside light obtained when a voltage is applied.

As shown in FIG. 4, a parallel Nicols configuration is adopted in the reflective liquid crystal panel 20. In the reflective liquid crystal panel 20, the incident light passes through the single liquid crystal panel polarization plate 22 twice in all, i.e., when it enters the liquid crystal panel polarization plate 22 and when it is reflected by the reflection electrode 8. As such, it is the most suitable that polarization of the incident light thus reflected by the reflection electrode 8 is circular polarization which has less wavelength dependency. In view of this, the λ/4 plate 21 is provided between the liquid crystal cell 10 and the liquid crystal panel polarization plate 22 so as to adjust the polarization of the incident light.

According to the liquid crystal panel 20, when the linearly polarized light enters the λ/4 plate 21 downward via the liquid crystal panel polarization plate 22 while no voltage is applied, the linearly polarized light is converted into, for example, left circularly polarized light by the λ/4 plate 21 (see FIG. 5(a)). The left circularly polarized light is reflected by the reflection electrode 8 to become right circularly polarized light. Note that a rotational direction of the circularly polarized light is defined as a rotational direction being watched from a light traveling direction side. Then, the right circularly polarized light passes through the liquid crystal panel polarization plate 22, again, via the λ/4 plate 21. Thus, a phase difference of λ/2 is given with respect to the original linearly polarized light that enters the λ/4 plate 21. The right circularly polarized light therefore becomes linearly polarized light that is orthogonal to the original linearly polarized light. As a result, the light thus reflected by the reflection electrode 8 cannot pass through the liquid crystal panel polarization plate 22.

On the other hand, when an on-voltage is applied, the VA mode liquid crystal molecules tilt. By birefringence of the liquid crystal molecules thus tilting, the liquid crystal cell 10 converts, into linearly polarized light, the left circularly polarized light passing though the λ/4 plate (see FIG. 5(b)). The linearly polarized light thus converted has a polarized wave surface that is rotated by 90° with respect to a polarized wave surface of linearly polarized light that enters the λ/4 plate 21 via the liquid crystal panel polarization plate 22. The linearly polarized light thus converted passes through a liquid crystal layer and the λ/4 plate 21 again, after being reflected by the reflection electrode 8. This causes the phase difference to be λ (360°), thereby causing the linearly polarized light thus converted to become the original linearly polarized light. On this account, the linearly polarized light thus becoming the original linearly polarized light can pass through the liquid crystal panel polarization plate 22.

Figure 6:
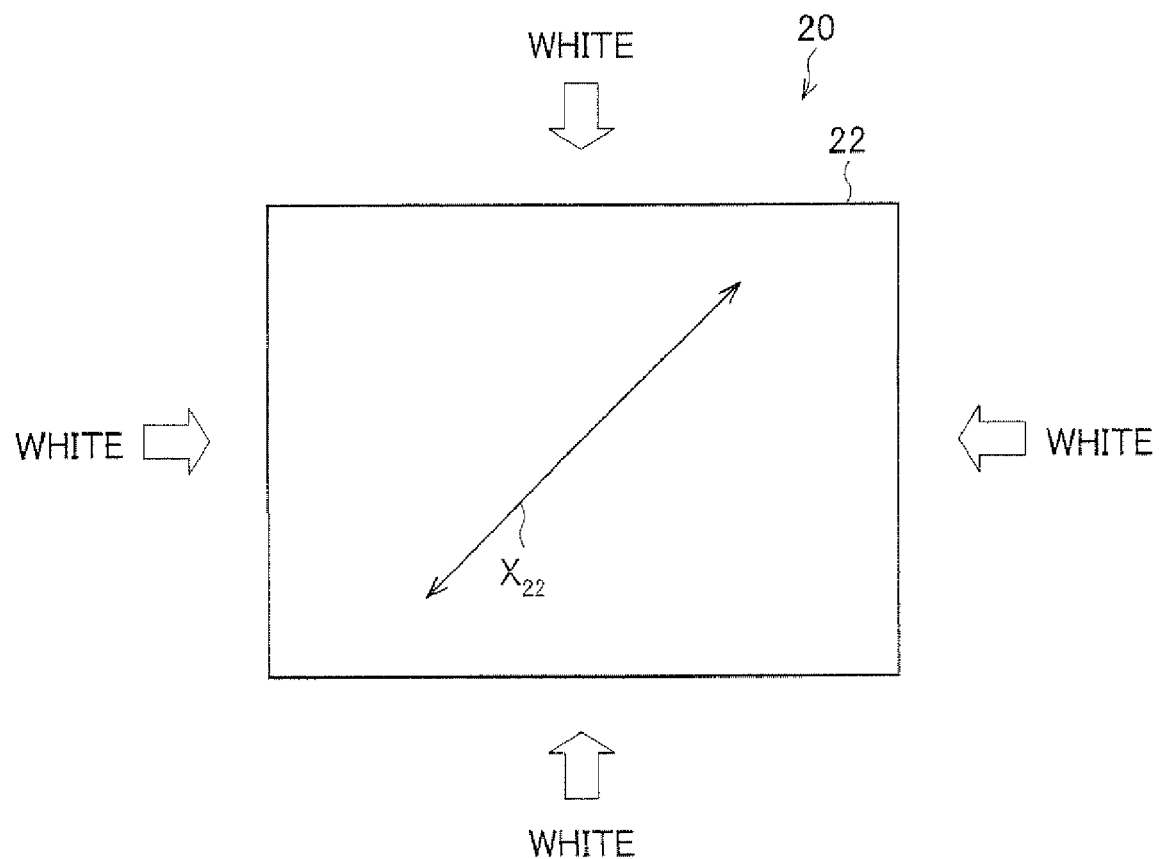
FIG. 6 is a plan view of the liquid crystal panel, showing a display property obtained when the voltage to the liquid crystal panel is applied.

In ordinary liquid crystal panels as well as the liquid crystal panel 20 of the present embodiment, the application of an on-voltage causes the linearly polarized light to be gone out from the liquid crystal panel polarization plate 22, as described above. This allows a display on the liquid crystal cell 10 to be viewed in any of top, bottom, right, and left directions, when a display screen of the liquid crystal panel 20 is viewed (see FIG. 6). In FIG. 6, $X_{22}$ indicates an absorption axis of the liquid crystal panel polarization plate 22. In FIG. 6, a direction in which the display is visible is indicated by "white."

Next, the following description deals with a negative C plate 31 and a polarization plate 32, which are stacked on the liquid crystal panel 20. This is a characteristic arrangement of the present embodiment.

As shown in FIGS. 7(a) and 7(b), the negative C plate 31 of the present embodiment is a retardation plate whose three main refraction indexes nx, ny, and nz satisfy a relation of nx=ny>nz. The main refraction indexes nx, ny, and nz are refraction indexes in directions of axes x, y, and z that are orthogonal to each other.

Also, the negative C plate 31 of the present embodiment is further arranged so as to cause a phase difference of λ/4 to be generated between an ordinary light component and an extraordinary light component, when the liquid crystal panel is viewed in a direction at a particular polar angle φk (described later with reference to FIG. 9). As such, in a case where the particular polar angle φk is, for example, 15°, the negative C plate 31 serves as a λ/4 plate with respect to light that travels at the polar angle φk of 15°.

Figure 8:
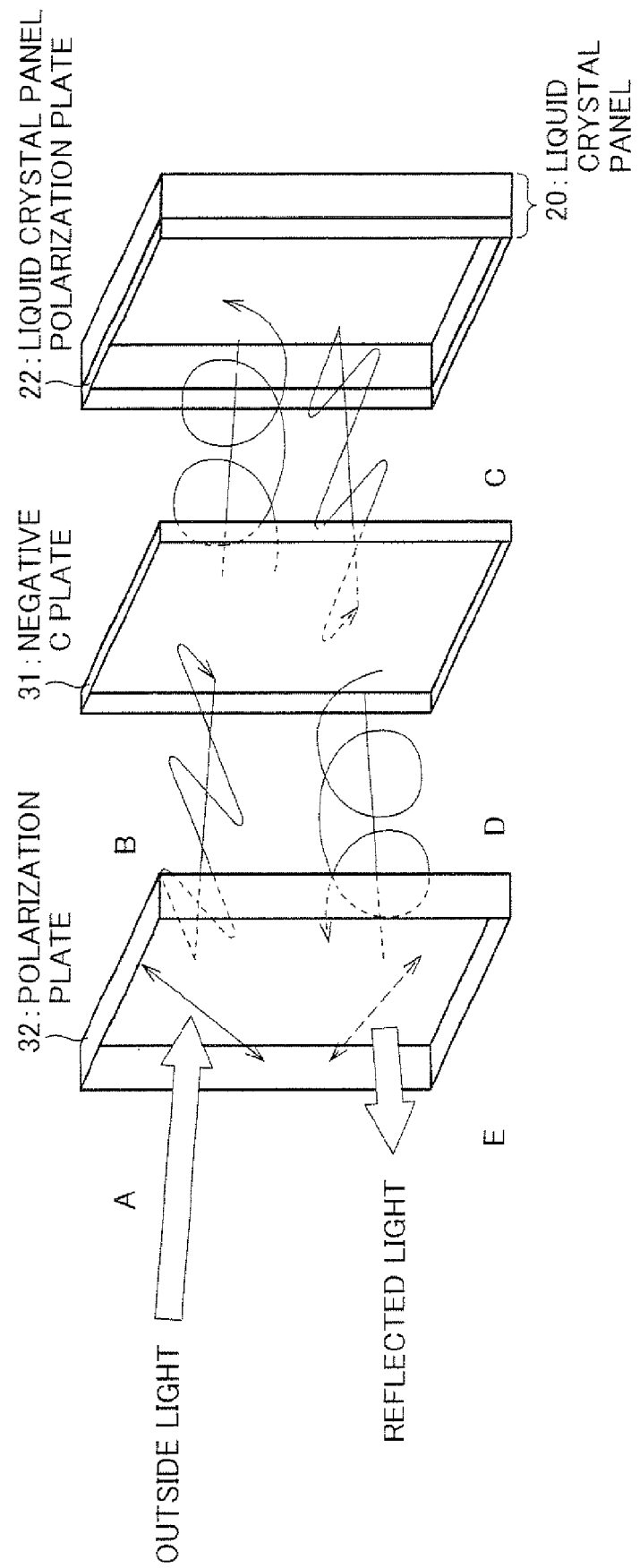
FIG. 8 is a perspective view for showing a principle of visibility limitation carried out when the liquid crystal display device is diagonally viewed.

As shown in FIG. 8, light, which has entered the reflective liquid crystal panel 20 via the polarization plate 32 and the negative C plate 31 serving as the λ/4 plate, passes through the negative C plate 31 twice in all, i.e., when it enters the negative C plate 31 and when it is reflected by the reflection electrode 8. As a result, a phase difference of (λ/4+λ/4)=λ/2 is generated, thereby resulting in that the light cannot pass through the polarization plate 32 provided on a front surface side of the negative C plate 31. This causes a black display to be made in the particular polar direction φk of 15°.

The following description provides a detailed reason for the above. First, outside light diagonally enters, at a particular polar angle of φk, the polarization plate 32 on the light incident side. Then, the outside light is converted into linearly polarized light by the polarization plate 32, and enters the negative C plate 31. The linearly polarized light thus converted enters the negative C plate 31, and is given a phase difference of λ/4 by the negative C plate 31. This causes the linearly polarized light to be converted into circularly polarized light. The circularly polarized light thus converted enters the polarization plate 22. This causes the liquid crystal panel polarization plate 22 to transmit linearly polarized light having a light amount of less by $1/\sqrt{2}$ than that of the circularly polarized light.

Next, light reflected in the liquid crystal panel 20 returns to the liquid crystal panel polarization plate 22. This causes the light to be converted into linearly polarized light by the liquid crystal polarization plate 22 again, and causes the linearly polarized light to enter the negative C plate 31. The linearly polarized light having entered the negative C plate 31 is given a phase difference of λ/4 by the negative C plate 31 again. This causes the linearly polarized light to be converted into circularly polarized light, and causes the circularly polarized light to return to the polarization plate 32. The polarization plate 32 converts the circularly polarized light into linearly polarized light. The linearly polarized light is then directed toward the viewer, which linearly polarized light is caused by the polarization plate 32 to have a light amount of less by $1/\sqrt{2}$ than that of the circularly polarized light.

In the end, even in a case where a transmittance of the polarization plate 32, which transmittance is obtained when the outside light is converted into the linearly polarized light, is ignored, a light amount of the light having entered the liquid crystal display device of the present embodiment at the particular polar angle φk is decreased to $(1/\sqrt{2} \times 1/\sqrt{2})=½$. In practice, the above transmittance of the polarization plate is of several tens of percent. As such, the light amount is further decreased. For example, if the polarization plate 32 has a transmittance of 50% with respect to the outside light, a light amount of the light having entered the liquid crystal display device of the present embodiment at the particular polar angle φk is decreased to ¼. This allows the visibility limitation to be secured effectively.

In view of the fact that (i) the negative C plate 31 plays a main role of the visibility limitation and (ii) solely the linearly polarized light is directed from the liquid crystal panel 20 to the negative C plate 31, as described above, it is clear that retardations of the liquid crystal cell 10 and the λ/4 plate 21 can be ignored in understanding the reason for the visibility limitation in diagonal directions.

The negative C plate 31 does not affect the visibility limitation in a light path parallel to a direction of a normal line of the polarization plate 32, on the other hand. The light path parallel to the normal direction of the polarization plate 32 is a light path which (i) is in a front direction of the viewer and (ii) has a polar angle φk of 0°. Since the negative C plate 31 has a property satisfying a relation of nx=ny, it does not have optical anisotropy with respect to light traveling in a direction parallel to the normal direction. This causes the linearly polarized light to be transmitted through the negative C plate 31 without being affected, when the linearly polarized light enters and goes out from the negative C plate 31.

In the end, in the light path parallel to the normal direction of the polarization plate 32, the light amount is reduced due to only the transmittance of the polarization plate 32, which transmittance is obtained when the outside light is converted into the linearly polarized light. For example, in a case where the polarization plate 32 has a transmittance of 50%, a light amount of the light having entered the liquid crystal display device of the present embodiment at a polar angle φk of 0° is decreased to ½. As such, light having diagonally entered the liquid crystal display device of the present embodiment has a light amount which is decreased to ½, as compared to that of light having vertically entered the liquid crystal display device of the present embodiment.

In a case where absorption axes of the polarization plate 32 and the liquid crystal panel polarization plate 22 are parallel to each other, the negative C plate 31 can be arranged to cause a phase difference of λ/2 when the negative C plate 31 is viewed in a direction at a particular polar angle φk. In this case, the negative C plate 31 rotates, by 90°, a polarized wave surface of linearly polarized light incident on the negative C plate 31 via the polarization plate 32. Then, the negative C plate 31 directs the linearly polarized light to the liquid crystal panel polarization plate 22. The liquid crystal panel polarization plate 22 absorbs the linearly polarized light without transmitting it. As such, no light enters the liquid crystal panel 20. On this account, it is possible to limit the visibility obtained when the liquid crystal panel 20 is viewed in the direction at the particular polar angle φk.

For facilitating a better understanding, the description deals with a case where the visibility in a direction at "a particular polar angle φk of 15°" is limited. In practice, however, in a case where a phase difference of λ/4 is generated when the liquid crystal panel 20 is viewed at a particular polar angle φk, the visibility in the particular polar angle φk±10° is limited.

In the liquid crystal display device 30 of the present embodiment, it is possible to provide a phase difference of λ/4 in a direction at a particular polar angle φk of the negative C plate 31. As such, it is possible, by changing the designing of the negative C plate 31, to arbitrarily set a direction in which visibility obtained when the liquid crystal panel 20 is diagonally viewed should be limited.

Specifically, the direction is set such that, when the liquid crystal panel 20 is diagonally viewed at the particular polar angle φk, a phase difference of ½ is generated in a light path via which light entering the negative C plate 31 is reflected by the reflection electrode 8 in the liquid crystal panel 20, passes through the negative C plate 31 again, and is gone out from the negative C plate 31. The length of the light path is determined by thicknesses of the negative C plate 31, the liquid crystal panel polarization plate 22, and the liquid crystal panel 20. Thus, in entirety of the light path, (i) a thickness of the negative C plate 31 and (ii) a ratio between the main refraction indexes nx (or ny) and nz of the negative C plate 31 are set so that the phase difference of ½ is generated.

The following description deals with in detail how the visibility direction is limited when the phase difference of (¼+¼)=½ is generated. In the following description, a viewing angle is indicated by an azimuth θ and a polar angle φ, with a center of the display surface of the polarization plate 32 being a reference point. The viewing angle is defined by the display surface of the liquid crystal panel 20 and a certain viewing point to the polarization plate 32. FIG. 9 shows viewing angles of five viewing points P1 through P5 with respect to the polarization plate 32 of the liquid crystal display device 30.

Figure 9:
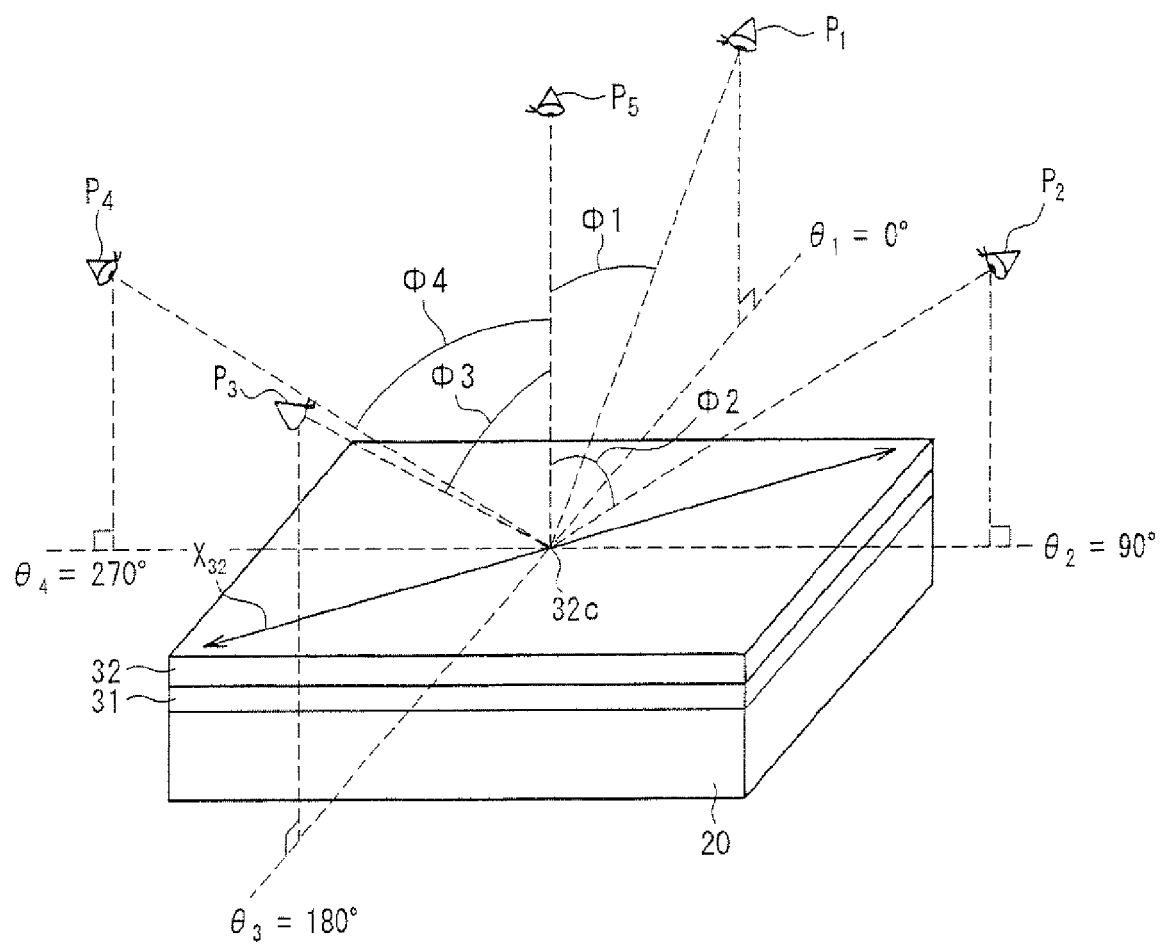
FIG. 9 schematically shows definitions of viewing angles to the liquid crystal display device.
Figure 10:
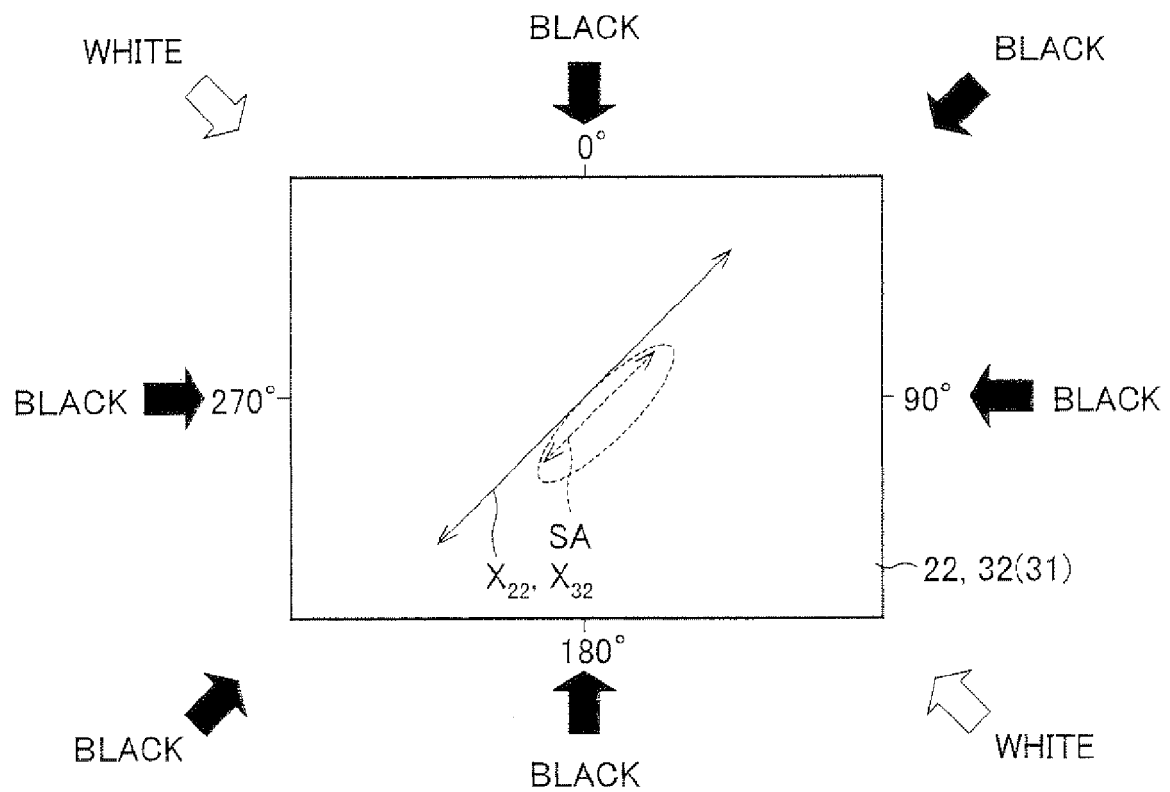
FIG. 10 is a plan view for showing the display property in the liquid crystal display device.
Figure 11:
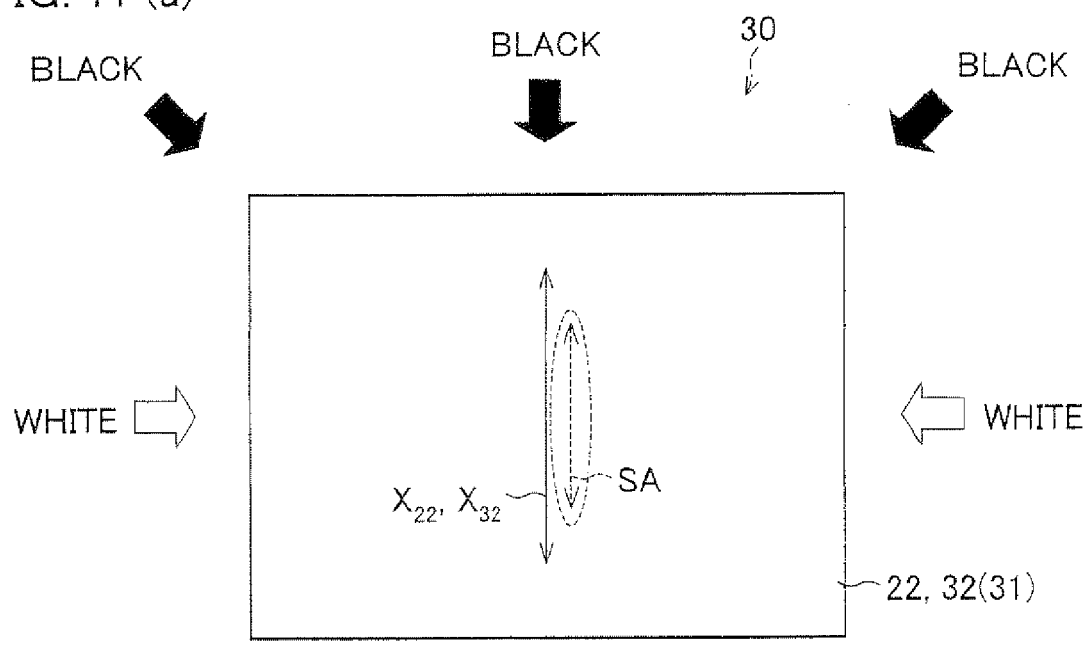
FIG. 11(a) is a plan view for showing a display property obtained when an absorption axis of a liquid crystal panel polarization plate and that of a polarization panel, which absorption axes are shown in FIG. 10, are rotated by −45°.
FIG. 11(b) is a plan view for showing a display property obtained when the absorption axis of the liquid crystal panel polarization plate and that of the polarization panel, which absorption axes are shown in FIG. 10, are rotated by 45°.
Figure 11:
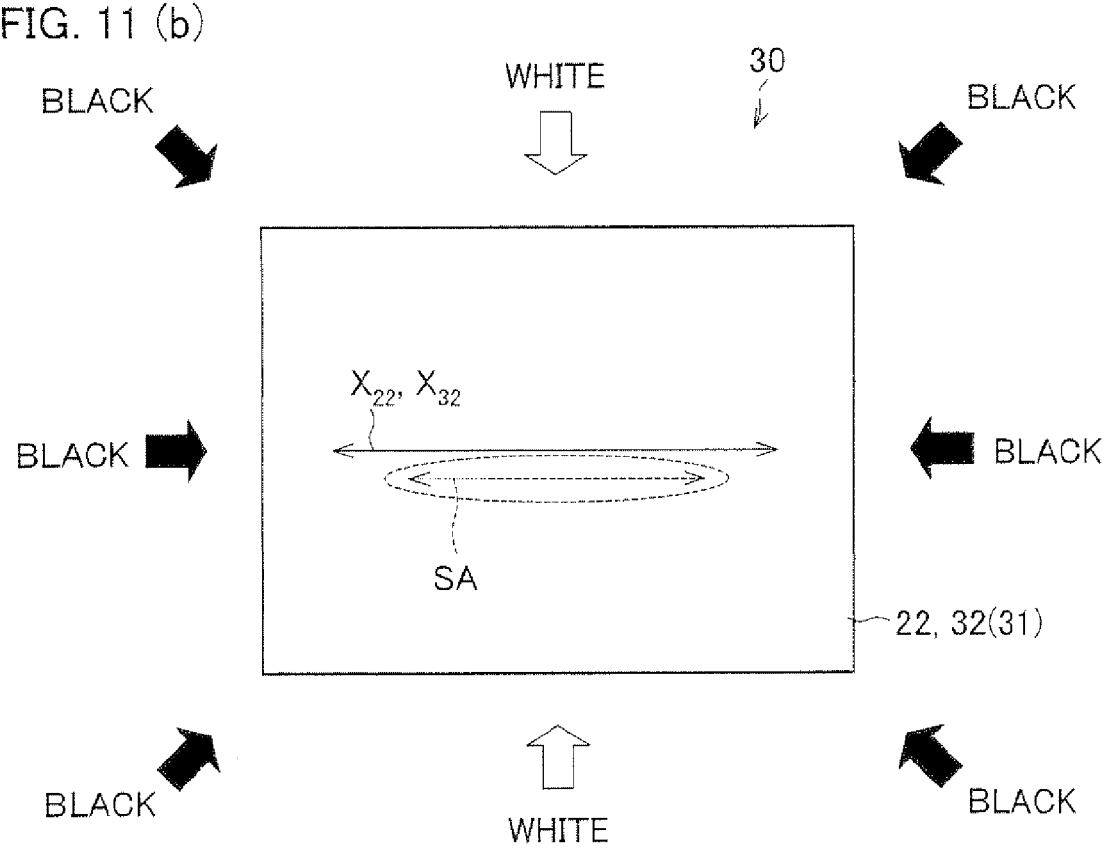

As shown in FIG. 9, an azimuth θ is a rotational angle of a line that connects (i) a center 32c of the polarization plate 32 to (ii) a point on a surface of the polarization plate 32 to which point a perpendicular line of a viewing point extends. FIG. 9 shows an example in which an azimuth θ increases clockwise from the viewing point P5 that is positioned on the normal line of the polarization plate 32. According to the example in FIG. 9, a first viewing point P1 has an azimuth θ1 of 0°, a second viewing point P2 has an azimuth θ2 of 90°, a third viewing point P3 has an azimuth θ3 of 180°, a fourth viewing point P4 has an azimuth θ4 of 270°.

A polar angle φ is an angle defined by (i) a line connecting the center 32c of the polarization plate 32 to a viewing point and (ii) the normal line of the polarization plate 32. In this example, it is assumed that all of the polar angles φ1 through φ4 are, for example, 45°. A fifth viewing point P5 can be said as a viewing point on a normal line of the liquid crystal panel polarization plate 22.

In the reflective liquid crystal panel 20, the negative C plate 31 gives a phase difference of λ/2, in all, with respect to the polarized light that enters and goes out from the negative C plate 31 in a direction at a particular polar angle φk, i.e., in a specific diagonal direction. That is, if the linearly polarized light is considered to be constituted by two sine wave components, then the negative C plate 31 has a function of shifting, by a half waveform) (180°, a phase of one of the two sine wave components of the linearly polarized light that enters the negative C plate 31. As a result, for example, a black display is carried out at the viewing point P1 (azimuth of 0°), the viewing point P2 (azimuth of 90°, the viewing point P3 (azimuth of 180°), the viewing point P4 (azimuth of 270°), an azimuth of 45°, and an azimuth of 225° (see FIG. 10). This allows the visibility to be limited at least in four directions (top, bottom, right and left). In contrast, a white display is carried out at the viewing point P5 (polar angle φ of 0° located in the front surface direction, an azimuth of 135°, and an azimuth of 305°.

The black display and the white display refer to display conditions, respectively, that are obtained when a voltage is applied to the liquid crystal cells 10.

The reason why the white display is carried out at the viewing point P5 (polar angle φ of 0° located in the front surface direction is that, as is clear from FIG. 7(b), light passing through the negative C plate 31 from the viewing point P5 (polar angle φ of 0°) located in the front surface direction is converted into circularly polarized light. That is, since the negative C plate 31 satisfies the relation of nx=ny, it does not give any effect of birefringence to the light traveling in the normal line direction. As such, as described with reference to FIG. 5(b), when the on-voltage is applied, the linearly polarized light on its return route can pass through the liquid crystal panel polarization plate 22 and the polarization plate 32.

The reason why the white display is carried out at the azimuths of 135° and 305° is that: (i) the absorption axis $X_{22}$ of the liquid crystal panel polarization plate 22 and the absorption axis $X_{32}$ of the polarization plate 32 are parallel to a slow axis SA of the negative C plate 31 (the absorption axes $X_{22}$ and $X_{32}$ are parallel to an x-y plane correlative to the main refraction indexes nx and ny of the negative C plate 31) and (ii) the directions of the azimuths of 135° and 305° are parallel to transmission axes of the liquid crystal panel polarization plate 22 and the polarization plate 32. The absorption axes $X_{22}$ and $X_{32}$ of the liquid crystal panel polarization plate 22 and the polarization plate 32 are orthogonal to the transmission axes of the liquid crystal panel polarization plate 22 and the polarization plate 32, respectively.

By the way, in order that (i) an amount of light incident on the liquid crystal panel 10 is maximized and (ii) the effect of limiting the visibility of the incident light from a particular polar angle φk is maximized, it is preferable to arrange the transmission axes of the liquid crystal panel polarization plate 22 and the polarization plate 32 to be parallel to each other, as described above. However, even in a case where the transmission axes of the liquid crystal panel polarization plate 22 and the polarization plate 32 are arranged to be substantially parallel to each other, the effect of the visibility limitation can be obtained more, as compared to conventional techniques. As such, it is not requisite in the present invention that the transmission axes are parallel to each other.

Thus, the absorption axis $X_{22}$ of the liquid crystal panel polarization plate 22 and the absorption axis $X_{32}$ of the polarization plate 32 are rotated by −45° so as to be parallel to a longitudinal direction of the display screen (see FIG. 11(a)). This makes it possible to provide a liquid crystal display device 30 in which the white display is carried out (i) in transverse directions of the display screen and (ii) at the viewing point P5 (polar angle φ of 0°) located in the front direction, whereas the black display is carried out in directions other than the above directions.

On the other hand, the absorption axis $X_{22}$ of the liquid crystal panel polarization plate 22 and the absorption axis $X_{32}$ of the polarization plate 32 are rotated by +45° so as to be parallel to the transverse direction of the display screen (see FIG. 11(b)). This makes it possible to provide a liquid crystal display device 30 in which the white display is carried out (i) in longitudinal directions of the display screen and (ii) at the viewing point P5 (polar angle φ of 0°) located in the front direction, whereas the black display is carried out in directions other than the above directions.

Thus, it is possible to realize a liquid crystal display device 30 in which the visibility limitation is carried out in directions other than the longitudinal directions or transverse directions, by arranging pixels such that the absorption axis $X_{22}$ of the liquid crystal panel polarization plate 22 and the absorption axis $X_{32}$ of the polarization plate 32 are parallel to the longitudinal directions or the transverse directions.

Figure 12:
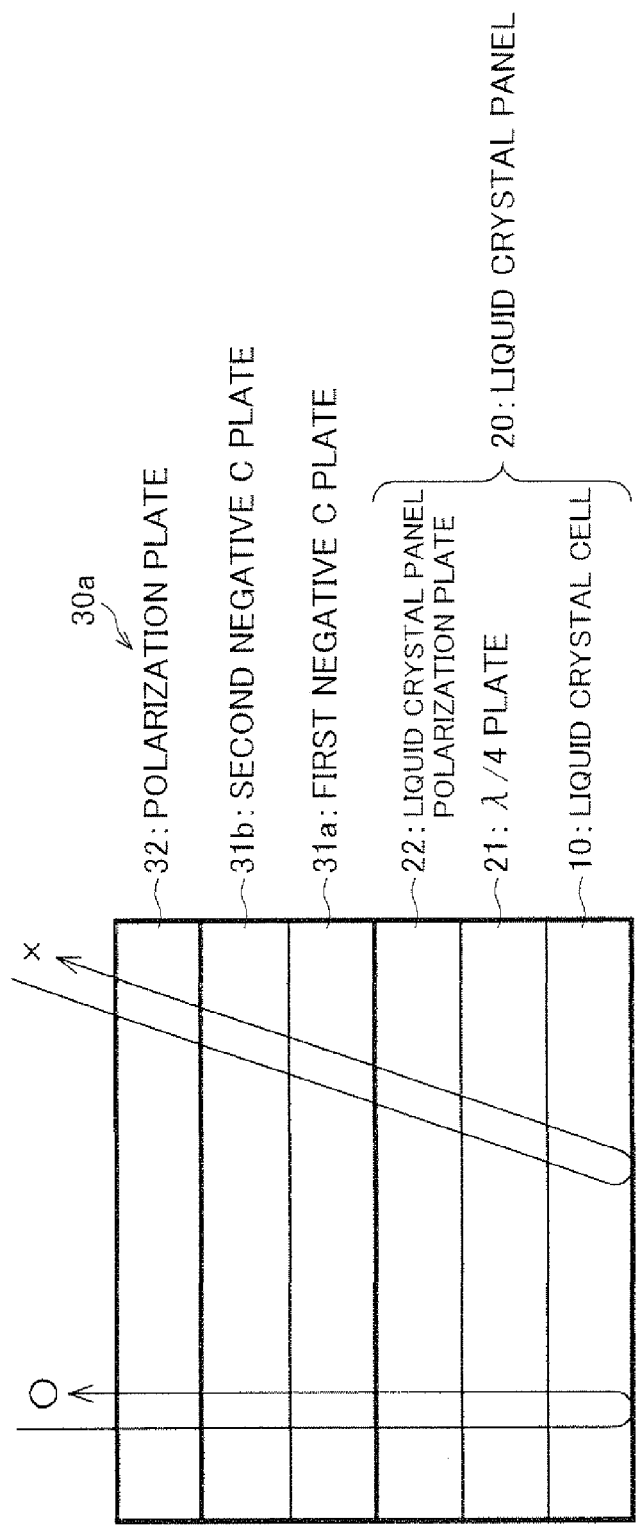
FIG. 12 is a cross-sectional view for schematically showing an arrangement of an exemplary modification of the liquid crystal display device.

The above description deals with a case where the negative C plate is made of a single retardation plate, as shown in FIG. 1. In the present invention, in contrast, a retardation plate is not necessarily limited to this arrangement. Alternatively, a retardation plate serving as a retardation member and a first retardation plate can be made up of, for example, two retardation plates. As shown in FIG. 12, a retardation plate can be made up of, for example, a first negative C plate 31a and a second negative C plate 31b. This can bring about the similar effect.

Also, with regard to the first negative C plate 31a and the second negative C plate 31b, it is possible to provide a liquid crystal display device 30a in which the first negative C plate 31a and the second negative C plate 31b cause a phase difference of λ/4, in their entirety, in a direction at the specific polar angle φk (see FIG. 12).

Alternatively, it is also possible to provide a liquid crystal display device 30b in which a first negative C plate 31a, one of two negative C plates, causes a phase difference of λ/4 in a direction at a first specific polar angle φk1, whereas a second negative C plate 31b, the other one of the two negative C plates, causes a phase difference of λ/4 in a direction at a second specific polar angle φk2. This makes it possible to widen a range in which the visibility limitation in a diagonal direction should be carried out.

Figure 13:
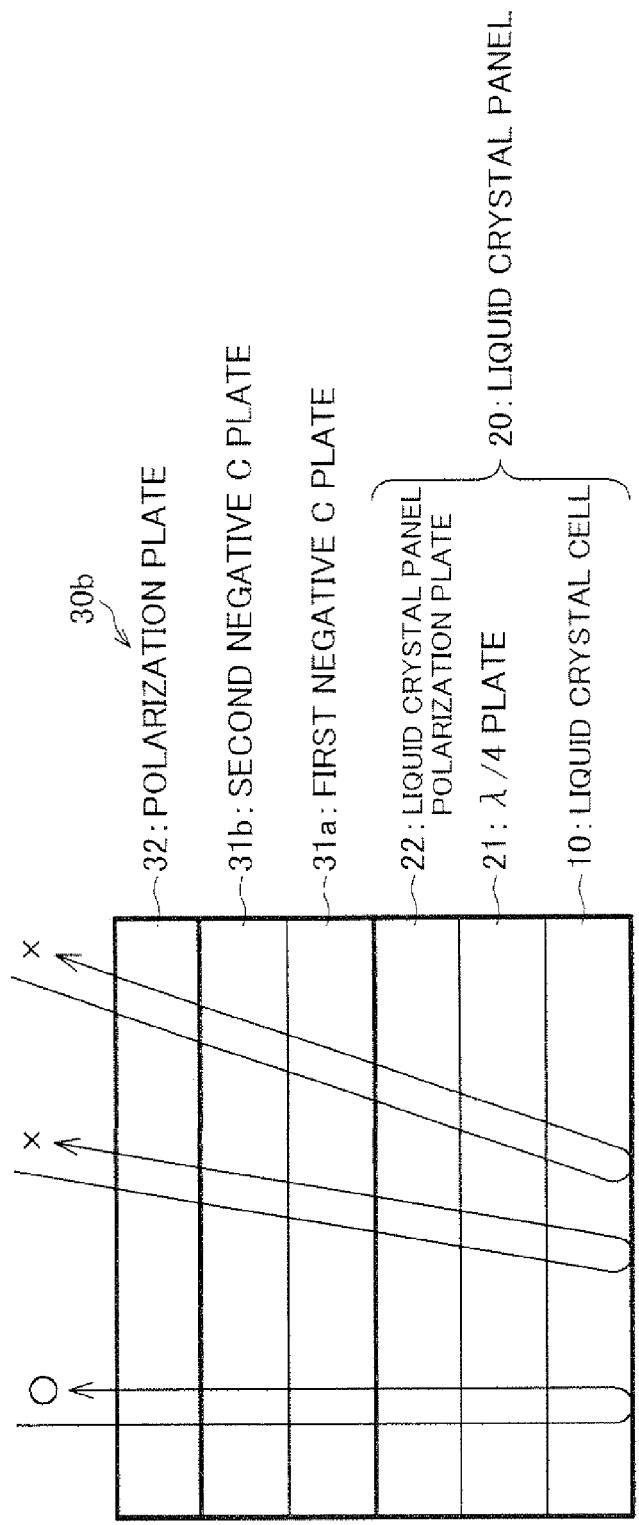
FIG. 13 is a cross-sectional view for schematically showing an arrangement of another exemplary modification of the liquid crystal display device.

Note that, FIGS. 12 and 13 exemplify the cases where the two retardation plates, i.e., the first negative C plate 31a and the second negative C plate 31b, are provided. The present embodiment is, however, not necessarily limited to this. Instead, a plurality of retardation plates, e.g., 3 or more retardation plates, can be provided.

As is clear from the above, the liquid crystal display devices 30, 30a, and 30b of the present embodiment include (i) the negative C plate 31 or (ii) the first negative C plate 31a and the second negative C plate 31b between the liquid crystal panel polarization plate 22 and the polarization plate 32 in the reflective liquid crystal panel 20. The negative C plate 31, the first negative C plate 31a, and the second negative C plate 31b serve as a retardation member for setting a direction in which the visibility limitation should be carried out.

As such, when (i) the negative C plate 31 or (ii) the first negative C plate 31a and the second negative C plate 31b set(s) a direction(s) in which visibility should be limited, the visibility in the direction(s) thus set is limited. That is, the display content on the liquid crystal panel 20 cannot be viewed, in the direction(s) thus set. It is therefore possible to narrow the viewing angle.

As a result, it is possible to provide the liquid crystal display devices 30, 30a, and 30b in each of which the viewing angle can be narrowed. In each of the liquid crystal display devices 30, 30a, and 30b, a direction in which the visibility limitation should be carried out can be set freely in accordance with the designing of the negative C plate. It is therefore possible to narrow the viewing angle.

Also, in the liquid crystal display device 30 of the present embedment, the negative C plate serving as the first retardation plate satisfies the relation of nx=ny>nz. As such, when the main refraction indexes nx, ny, and nz are subjected to the three-dimensional display, the main refraction indexes appear to be a spheroid having a humilis shape in its height direction. Thus, when the liquid crystal panel 20 is viewed in a direction at a set polar angle φk (0°<φk<90°), an equal luminance display is carried out except in some azimuths, thereby causing no adverse effect on the display content, such as distortion.

According to the present embodiment, while the visibility in a diagonal direction is being secured, a phase difference in one way of a light path is equal to λ/4 when the liquid crystal panel 20 is viewed in a direction at the set polar angle φk (0°<φk<90°). As such, the phase differences of λ/4 occurred on approach and return routes amount to λ/2. Thus, the visibility is limited when the liquid crystal panel 20 is viewed diagonally, i.e., when the liquid crystal panel 20 is viewed in the direction at the set polar angle φk (0°<φk<90°).

In the liquid crystal display devices 30a and 30b of the present embodiment, the first retardation plate is made up of a plurality of the retardation plates. This brings about two types of effects.

One of the two types of the effects is that it is possible to set a phase difference so that the plurality of the retardation plates can have a one way phase difference of λ/4 in their entirety when the liquid crystal panel 20 is viewed in a direction at a set single constant polar angle φk (0°<φk<90°). This allows the plurality of negative C plates, i.e., a first negative C plate 31a and a second C plate 31b, to cause the phase difference of λ/4 in their entirety with respect to one way of a light path, in a case where a single retardation plate alone cannot cause such a phase difference of λ/4 with respect to one way of the light path occurred when the liquid crystal panel 20 is viewed in the direction at the constant polar angle φk (0°<φk<90°.

The other one of the two types of the effects is that it is possible to (i) set constant polar angles φk (0°<φk<90°), which are different from each other, for the first negative C plate 31a and the second negative C plate 31b serving as a retardation plate, respectively, and (ii) set phase differences so that the first negative C plate 31a and the second negative C plate 31b have their phase differences of λ/4, respectively, with respect to one ways of light paths occurred when the liquid crystal panel 20 is viewed in directions at the polar angles φk. This makes it possible to control the display so that its visibility is limited in a diagonal direction over a wide range.

Embodiment 2

The following description deals with another embodiment of the present invention, with reference to FIGS. 14 through 17. Note that arrangements other than described hereinafter in the present embodiment are the same as those of Embodiment 1. For convenience of an explanation, members having the same functions as those shown in the drawings in Embodiment 1 are given the same reference numerals, and the explanations thereof are omitted.

Figure 14:
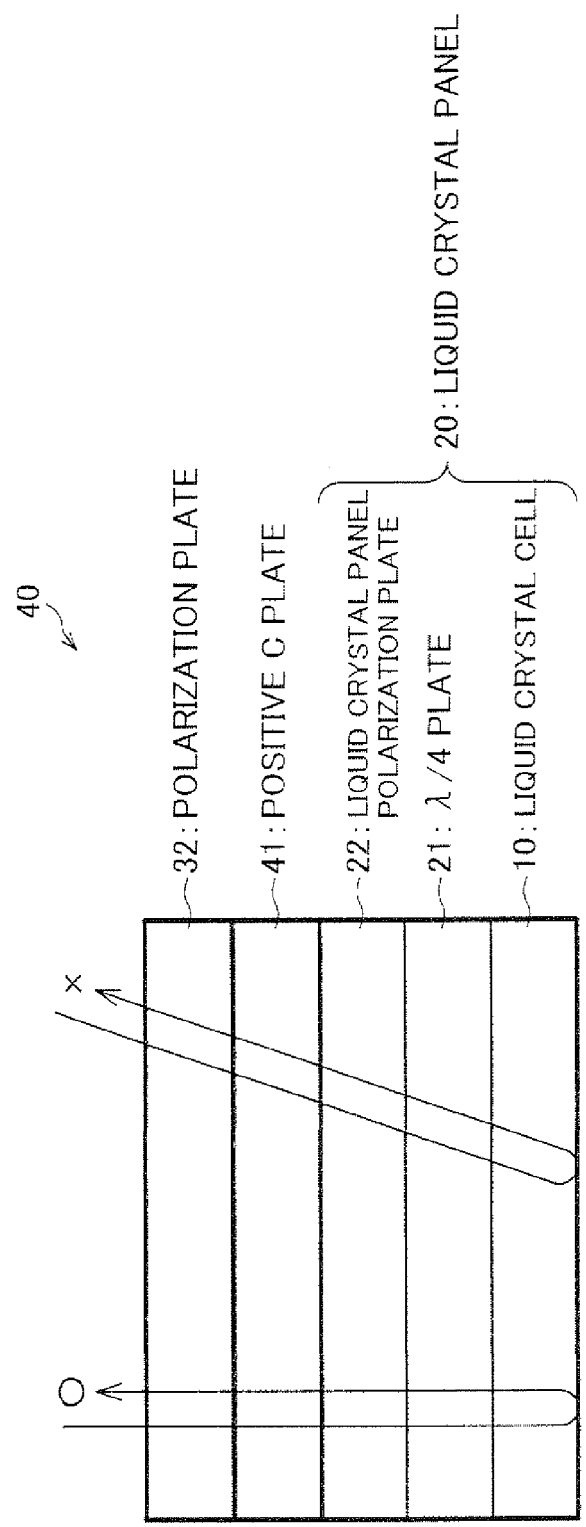
FIG. 14 is a cross-sectional view of an arrangement of a liquid crystal display device, schematically showing the liquid crystal display device of another embodiment in accordance with the present invention.
Figure 16:
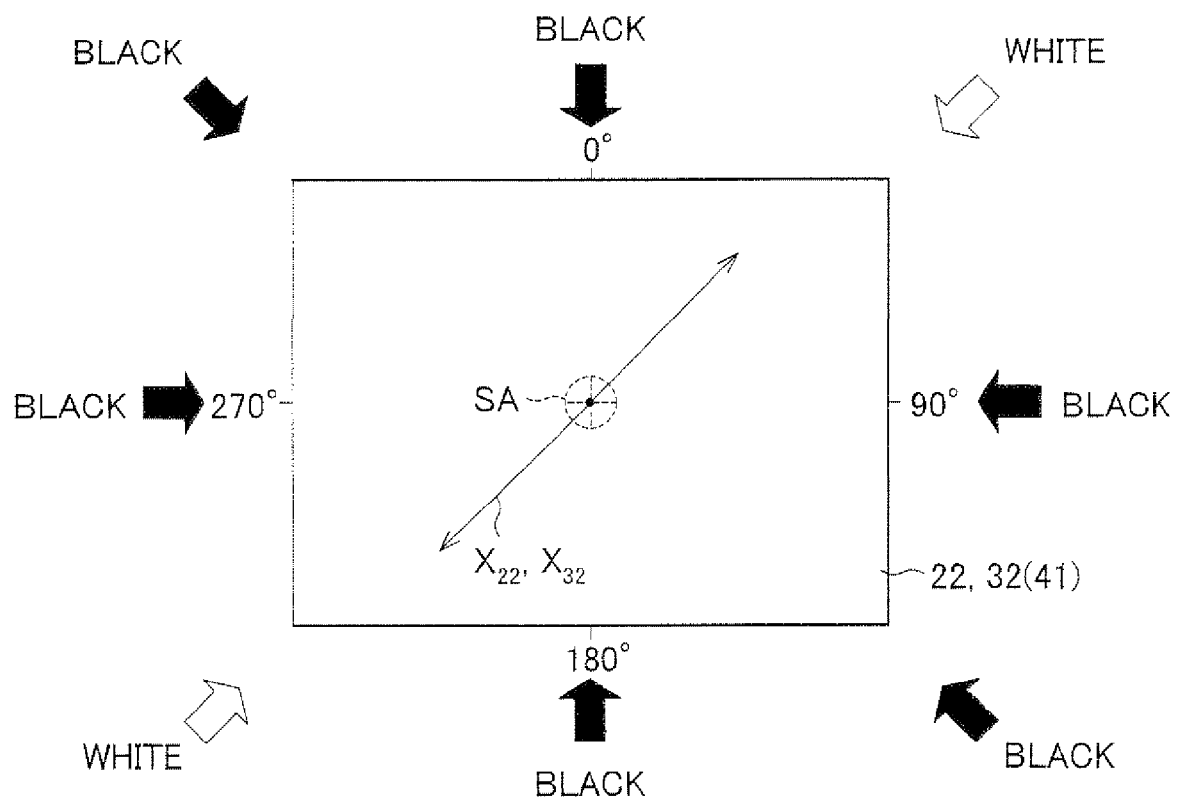
FIG. 16 is a plan view for showing a display property in the liquid crystal display device.
Figure 17:
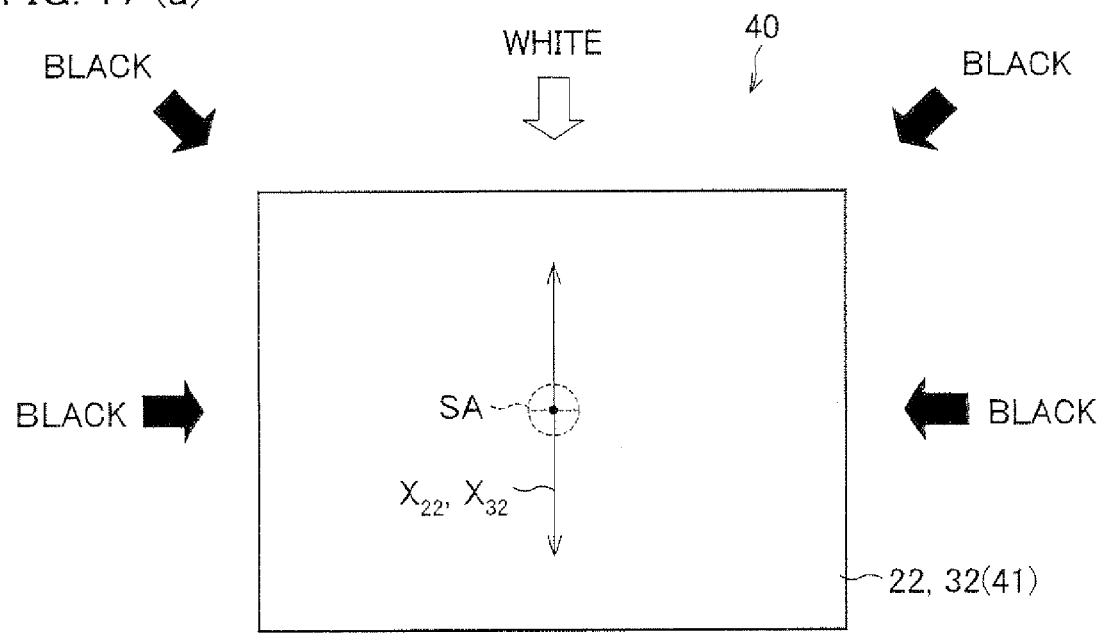
FIG. 17(a) is a plan view for showing a display property obtained when an absorption axis of a liquid crystal panel polarization plate and that of a polarization plate, which absorption axes are shown in FIG. 16, are rotated by −45°.
FIG. 17(b) is a plan view for showing a display property obtained when the absorption axis of the liquid crystal panel polarization plate and that of the polarization plate, which absorption axes are shown in FIG. 16, are rotated by 45°.
Figure 17:
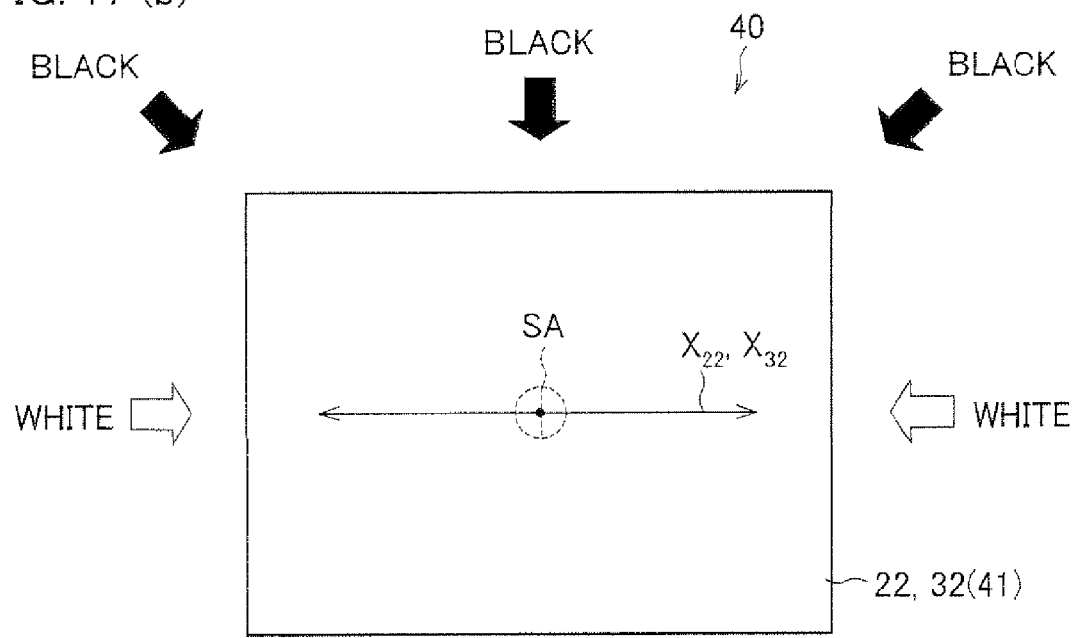

As shown in FIG. 14, a liquid crystal display device 40 of the present embodiment includes a positive C plate 41 (second retardation plate) in place of the negative C plate 31 in the liquid crystal display device 30 of Embodiment 1.

As shown in FIGS. 15(a) and 15(b), the positive C plate 41 is a retardation plate whose three main refraction indexes nx, ny, and nz satisfy a relation of nx=ny<nz. The main refraction indexes nx, ny, and nz are refraction indexes in axis directions of x, y, and z that are orthogonal to each other. The positive C plate 41 of the present embodiment is further arranged to cause a phase difference of λ/4, when a liquid crystal panel 20 is viewed in a direction at a particular polar angle φk.

The following description raises a case where a particular polar angle φk is, for example, 15°. In this case, as in the case shown in FIG. 8, light, which enters the reflective liquid crystal panel 20 via a polarization plate 32 and the positive C plate 41 serving as a λ/4 plate, passes through the positive C plate 41 twice in all, i.e., when it enters the positive C plate 41 and when it is reflected by a reflection electrode 8. As a result, a phase difference of (λ/4+λ/4)=λ/2 is generated, thereby resulting in that an amount of the light passing through the polarization plate 32 provided on a front surface side of the positive C plate 41 is reduced. This causes a black display to be made in the direction at the particular polar angle φk of 15°. As compared to the negative C plate 31, the positive C plate 41 can make wider a range of polar angles, in which visibility limitation can be carried out.

In the liquid crystal display device 40 of the present embodiment, it is possible to provide the phase difference of λ/4 in a direction at the particular polar angle φk of the positive C plate 41. As such, it is possible to arbitrarily set a direction in which the visibility obtained when the liquid crystal panel 20 is diagonally viewed should be limited. Specifically, the positive C plate 41 is set such that, when the liquid crystal panel 20 is diagonally viewed at a particular polar angle φk, a phase difference of λ/2 is generated in a light path via which the light entering the positive C plate 41 is reflected by the reflection electrode 8 in the liquid crystal panel 20, passes through the positive C plate 41 again, and is gone out from the positive C plate 41.

The following description deals with in detail how the visibility direction is limited when the phase difference of (¼+¼)=½ is generated.

In the reflective liquid crystal panel 20, the positive C plate 41 causes the phase difference of λ/2 in the direction at the particular polar angle φk, i.e., in the specific diagonal direction. That is, if linearly polarized light is considered to be constituted by two sine wave components, then the positive C plate 41 has a function of shifting, by a half waveform (180°), a phase of one of the two sine wave components of the linearly polarized light that has entered the positive C plate 41. As a result, for example, a black display is carried out at the viewing point P1 (azimuth of 0°, the viewing point P2 (azimuth of) 90°, the viewing point P3 (azimuth of 180°, the viewing point P4 (azimuth of 270°, an azimuth of 135°, and an azimuth of 305° (see FIG. 16). This allows the visibility to be limited in four directions (top, bottom, right and left). In contrast, a white display is carried out at the viewing point P5 (polar angle φ of 0° located in a front surface direction, an azimuth of 45°, and an azimuth of 225°.

The black display and the white display refer to display conditions, respectively, that are obtained when a voltage is applied to the liquid crystal cells 10.

The reason why the white display is carried out at the viewing point P5 (polar angle φ of 0° in the front surface direction is that, as is clear from FIG. 15(b), light, which passes through the positive C plate 41 from the viewing point P5 (polar angle φ of 0°) located in the front surface direction, is converted into circularly polarized light. That is, since the positive C plate 41 satisfies the relation of nx=ny, it does not give any effect of birefringence to the light in the normal line direction. As such, as described with reference to FIG. 5(b), when the on-voltage is applied, the linearly polarized light on its return route can pass through the liquid crystal panel polarization plate 22 and the polarization plate 32.

The reason why the white display is carried out at the azimuths of 45° and 225° is that: (i) an absorption axis $X_{22}$ of the liquid crystal panel polarization plate 22 and an absorption axis $X_{32}$ of the polarization plate 32 are orthogonal to a slow axis SA of the positive C plate 41, and (ii) directions of azimuths of 135° and 305° are parallel to the absorption axes $X_{22}$ and $X_{32}$ of the liquid crystal panel polarization plate 22 and the polarization plate 32. The slow axis SA of the positive C plate 41 is parallel to an axis z.

In a case where the absorption axes $X_{22}$ and $X_{32}$ of the liquid crystal panel polarization plate 22 and the polarization plate 32 are rotated by −45° (see FIG. 17(a)), it becomes possible to provide a liquid crystal display device 40 in which the white display is carried out (i) in longitudinal directions of a display screen and (ii) at the viewing point P5 (polar angle φ of 0°) located in the front surface direction, whereas the black display is carried out in directions other than the above directions.

On the other hand, in a case where the absorption axes $X_{22}$ and $X_{32}$ of the liquid crystal panel polarization plate 22 and the polarization plate 32 are rotated by +45° (see FIG. 17(b)), it becomes possible to provide a liquid crystal display device 40 in which the white display is carried out (i) in transverse directions of the display screen and (ii) at the viewing point P5 (polar angle φ of 0°) located in the front surface direction, whereas the black display is carried out in directions other than the above directions.

Thus, it is possible to realize a liquid crystal display device 40 in which the visibility limitation is carried out in directions other than the longitudinal directions or transverse directions, by arranging pixels such that the absorption axes $X_{22}$ and $X_{32}$ of the liquid crystal panel polarization plate 22 and the polarization plate 32 in the liquid crystal panel 20 of the liquid crystal display device 40 are parallel to the longitudinal directions or the transverse directions.

The above description deals with a case where the positive C plate is made of a single retardation plate, as shown in FIG. 14. In the present embodiment, in contrast, a retardation plate is not necessarily limited to this arrangement. Alternatively, the positive C plate 41 can be made up of, for example, two retardation plates. This can bring about the similar effect. It is also possible to make the retardation plate of a plurality of retardation plates, e.g., 3 or more retardation plates.

In the liquid crystal display device 40 of the present embodiment, the positive C plate serving as the second retardation plate satisfies the relation of nx=ny<nz. As such, when the main refraction indexes nx, ny, and nz are subjected to the three-dimensional display, the main refraction indexes appear to be an spheroid looking like an egg standing on end (see FIG. 15(b)). Thus, when the liquid crystal panel 20 is viewed in a direction at a set polar angle φk (0°<φk<90°), an equal luminance display is carried out except in some azimuths, thereby causing no adverse effect on the display content, such as distortion.

According to the present embodiment, while the visibility in a diagonal direction is being secured, one way phase difference is equal to $\lambda/4$ when the liquid crystal panel 20 is viewed in a direction at the set polar angle $\phi k$ ($0°<\phi k<90°$). As such, the phase differences of $\lambda/4$ occurred on approach and return routes amount to $\lambda/2$. Thus, the visibility is limited when the liquid crystal panel 20 is viewed diagonally, i.e., when the liquid crystal panel 20 is viewed in the direction at the set polar angle $\phi k$ ($0°<\phi k<90°$).

In order for a one way phase difference to become $\lambda/4$ when the liquid crystal panel 20 is viewed in the direction at the set polar angle $\phi k$ ($0°<\phi k<90°$), (i) a thickness of the second retardation plate and (ii) a ratio between the main refraction indexes nx (or ny) and nz of the second retardation plate should be set such that, when the liquid crystal panel 20 is viewed at the particular polar angle $\phi k$, a phase difference of $\lambda/2$ is generated in a light path via which light having entered the second retardation plate is reflected by the reflection electrode 8 in the liquid crystal panel 20, passes through the second retardation plate again, and is gone out from the second retardation plate.

In the liquid crystal display device 40 of the present embodiment, the positive C plate 41 serving as the second retardation plate can be made up of a plurality of retardation plates.

This brings about two types of effects.

One of the two types of the effects is that it is possible to set a phase difference so that the plurality of the retardation plates can have a phase difference of $\lambda/4$ in their entirety with respect to one way of a light path occurred when the liquid crystal panel 20 is viewed in a direction at a set single constant polar angle $\lambda k$ ($0°<\phi k<90°$). This allows the plurality of retardation plates to cause the phase difference of $\lambda/4$ in their entirety with respect to one way of the light path, in a case where a single retardation plate alone cannot cause such a phase difference of $\lambda/4$ with respect to one way of the light path occurred when the liquid crystal panel 20 is viewed in the direction at the constant polar angle $\phi k$ ($0°<\phi k<90°$).

The other one of the two types of the effects is that it is possible to (i) set constant polar angles $\phi k$ ($0°<\phi k<90°$), which are different from each other, for the retardation plates, respectively, and (ii) set phase differences so that the retardation plates have their phase differences of $\lambda/4$, respectively, with respect to one ways of light paths occurred when the liquid crystal panel 20 is viewed in directions at the polar angles $\phi k$. This makes it possible to control the display so that its visibility is limited in a diagonal direction over a wide range.

Embodiment 3

Figure 18:
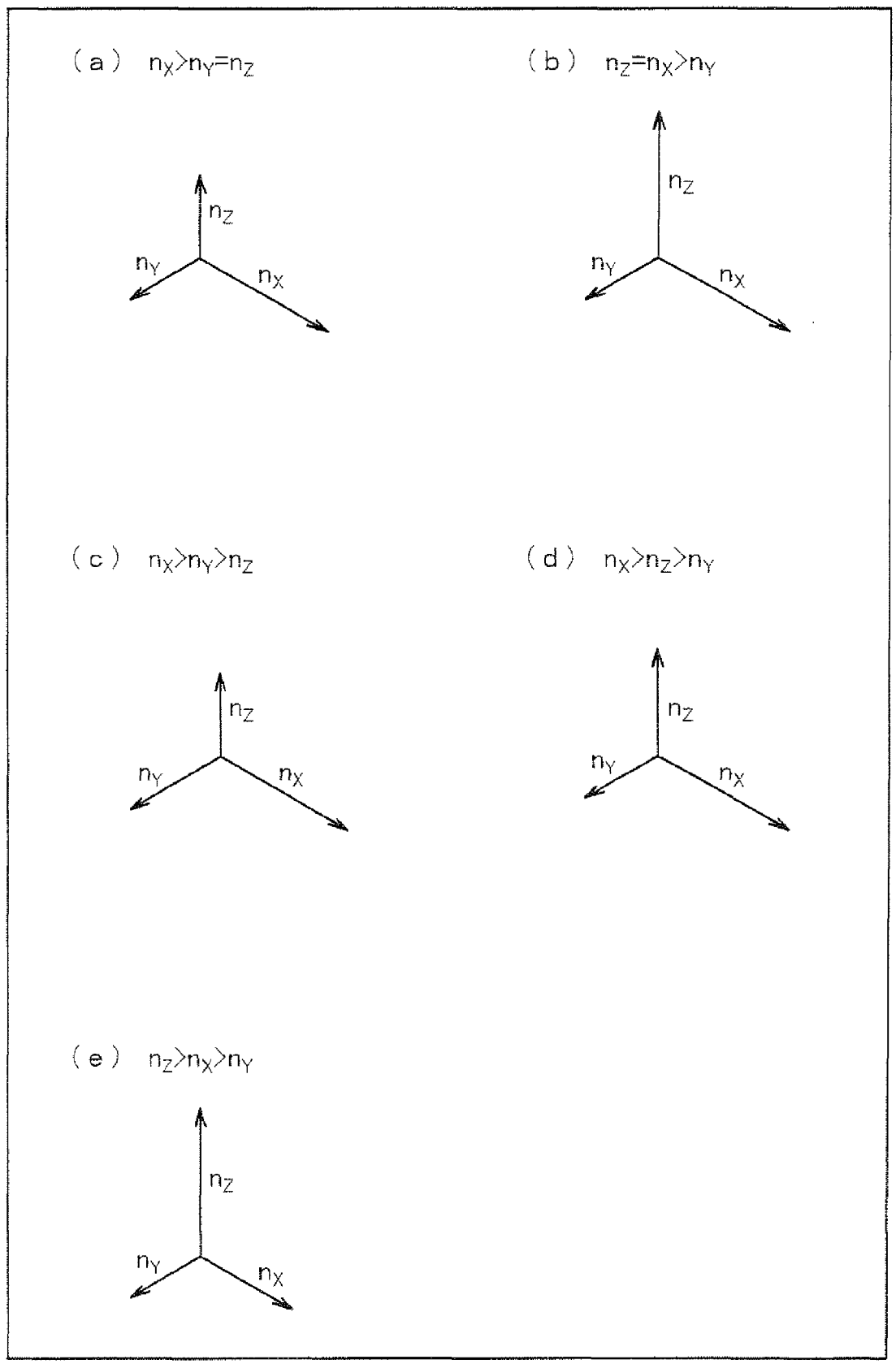
FIG. 18 shows a relation of three main refraction indexes nx, ny, and nz of a retardation plate usable in a liquid crystal display device of a further embodiment in accordance with the present invention.
Figure 19:
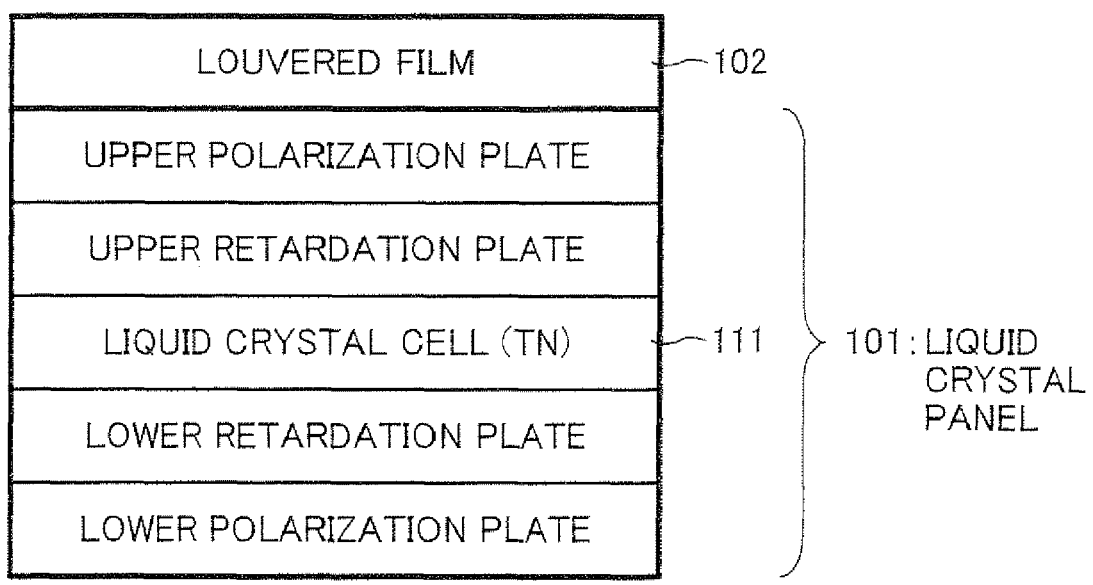
FIG. 19 is a cross-sectional view for showing an arrangement of a liquid crystal display device including a louvered film for conventional viewing angle control.
Figure 20:
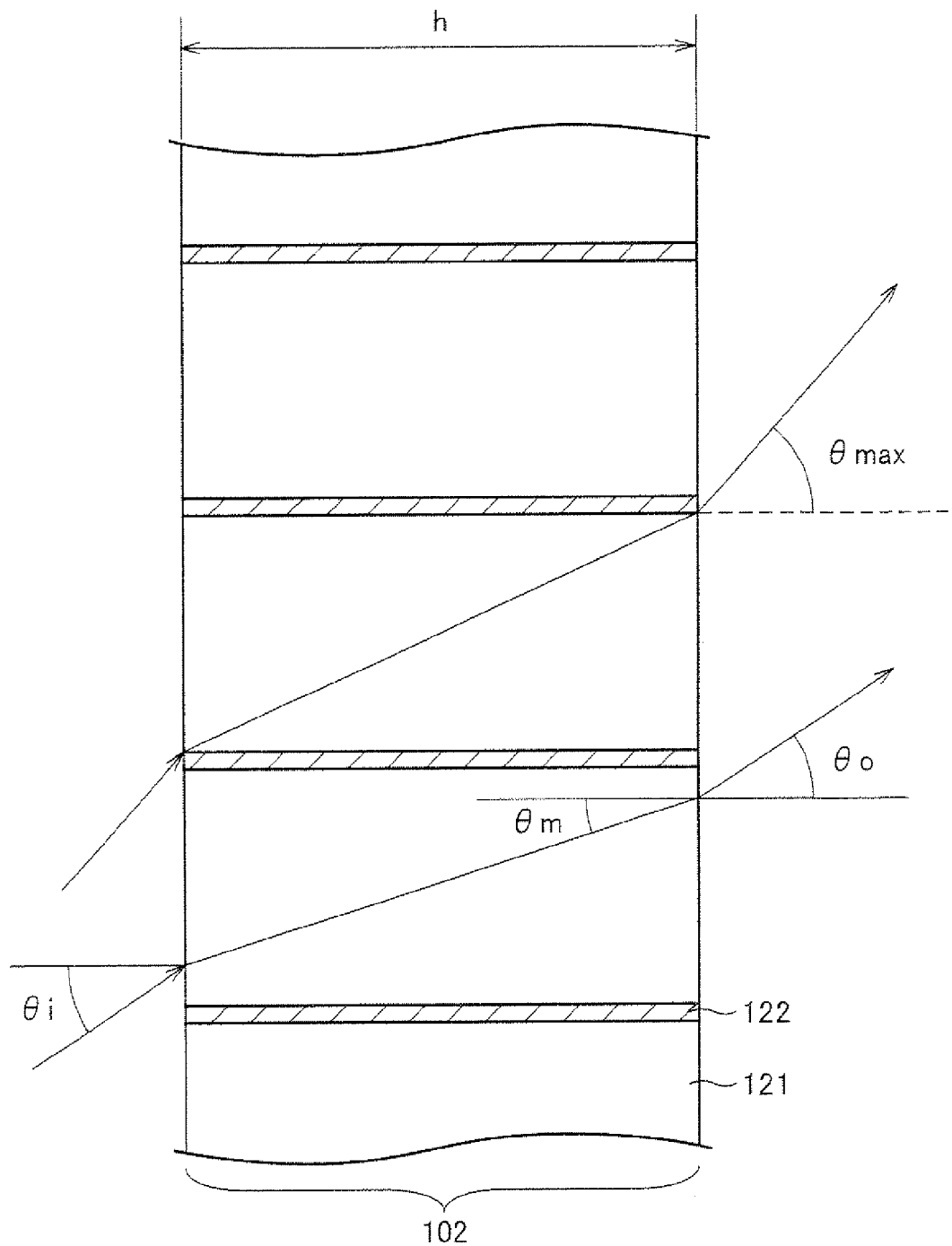
FIG. 20 is a cross-sectional view of the louvered film, showing a viewing angle control principle by the louvered film.

The following description deals with a further embodiment of the present invention, with reference to FIG. 18. Note that arrangements other than described hereinafter in the present embodiment are the same as those of Embodiment 1. For convenience of an explanation, members having the same functions as those shown in the drawings in Embodiments 1 and 2 are given the same reference numerals, and the explanations thereof are omitted.

As shown in FIGS. 18(a) through 18(e), a liquid crystal display device of the present embodiment includes a plate such as a positive A plate (nx>ny=nz), a negative A plate (nz=nx>ny), or an X plate (nx>ny>nz) in place of the negative C plate 31 in the liquid crystal display device 30 of Embodiment 1 and the positive C plate 41 in the liquid crystal display device 40 of Embodiment 2. The positive A plate, the negative A plate, and the X plate serves as a retardation member and a third retardation plate.

Each of the third retardation plate is arranged such that any one of axis directions of main refraction indexes nx and ny is parallel to an absorption axis $X_{32}$ of a polarization plate 32. Each of the third retardation plates further causes a one way phase difference of $\lambda/4$ when a liquid crystal panel 20 is viewed in a direction at a set polar angle $\phi k$ ($0°<\phi k<90°$).

That is, even in a case where a third retardation plate has main refraction indexes nx and ny that are not equal to each other, no phase difference is generated in a plane parallel to a display surface, provided that the third retardation plate is arranged so that any one of the axis directions of the refraction indexes nx and ny is parallel to the absorption axis $X_{32}$ of the polarization plate 32.

Thus, besides the positive A plate (nx>ny=nz), the negative A plate (nz=nx>ny), and the X plate (nx>ny>nz), any plate that that meets the above requirements can be used as the third retardation plate.

As shown in FIG. 18(a), the positive A plate satisfies the relation of nx>ny=nz. As shown in FIG. 18(b), the negative A plate satisfies the relation of nz=nx>ny. As shown in FIG. 18(c), the X plate satisfies the relation of nx>ny>nz.

In the present embodiment, it is possible to alternatively use, as the third retardation plate, a plate satisfying a relation of nx>nz>ny (see FIG. 18(d)) or a plate satisfying a relation of nz>nx>ny (see FIG. 18(e)) so that any one direction of the axis directions of the refraction indexes nx and ny is parallel to the absorption axis $X_{32}$ of the polarization plate 32.

In the present embodiment, each of the third retardation plates can be made up of a plurality of retardation plates, as in the cases of Embodiments 1 and 2.

This brings about two types of effects.

One of the two types of the effects is that it is possible to set a phase difference so that the plurality of the retardation plates can have a phase difference of $\lambda/4$ in their entirety with respect to one way of a light path occurred when the liquid crystal panel 20 is viewed in a direction at a set single constant polar angle $\phi k$ ($0°<\phi k<90°$). This allows the plurality of retardation plates to cause the phase difference of $\lambda/4$ in their entirety with respect to one way of the light path, in a case where a single retardation plate alone cannot cause such a phase difference of $\lambda/4$ with respect to one way of the light path occurred when the liquid crystal panel 20 is viewed in the direction at the constant polar angle $\phi k$ ($0°<\phi k<90°$).

The other one of the two types of the effects is that it is possible to (i) set single constant polar angles $\phi k$ ($0°<\phi k<90°$), which are different from each other, for the retardation plates, respectively, and (ii) set phase differences so that the retardation plates have their phase differences of $\lambda/4$, respectively, with respect to one ways of light paths occurred when the liquid crystal panel 20 is viewed in directions at the polar angles $\phi k$. This makes it possible to control the display so that its visibility is limited in a diagonal direction over a wide range.

Embodiment 4

Figure 21:
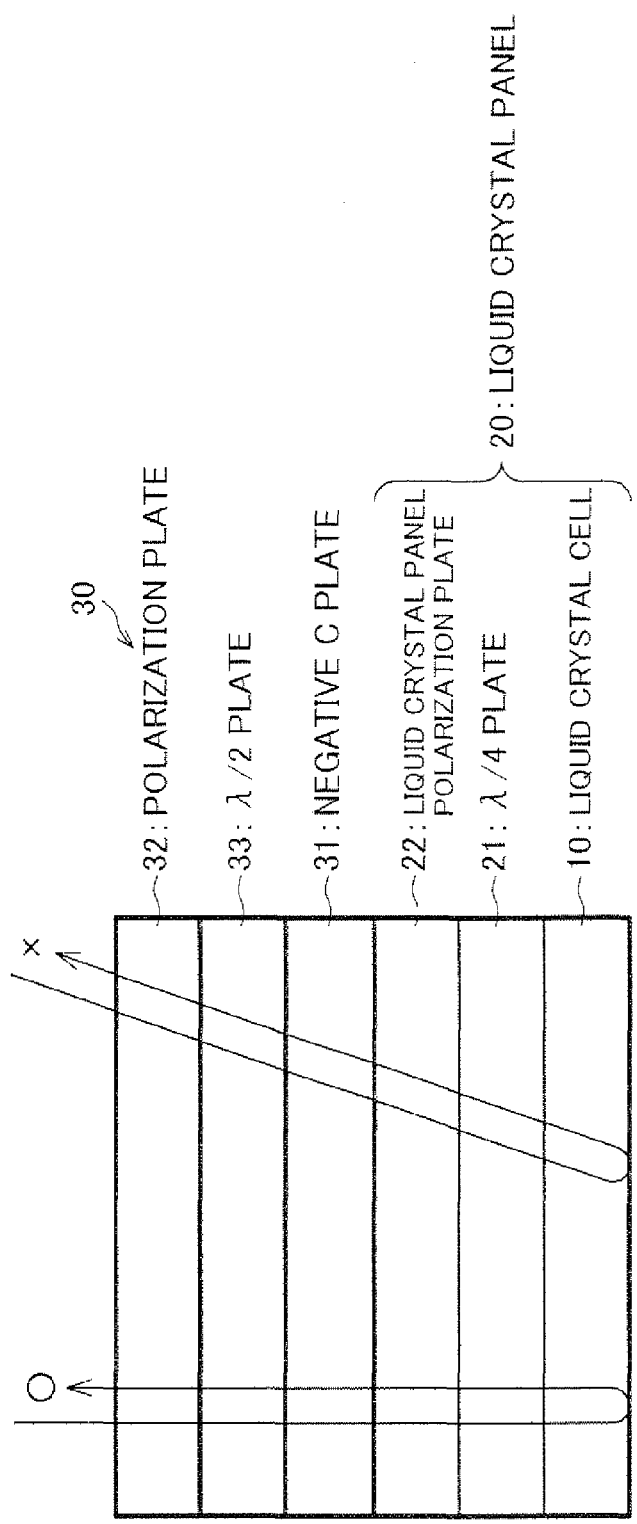
FIG. 21 is a cross-sectional view of an arrangement of a liquid crystal display device, schematically showing the liquid crystal display device of a further embodiment in accordance with the present invention.

The following description deals with a further embodiment of the present invention, with reference to FIG. 21. Note that arrangements other than described hereinafter in the present embodiment are same as those in Embodiment 1. For convenience of an explanation, members having the same functions as those shown in the drawings in Embodiments 1 through 3 are given the same reference numerals, and the explanations thereof are omitted.

In Embodiments 1 through 3, a parallel Nicols configuration is adopted. In the parallel Nicols configuration, an absorption axis of a polarization plate 32 and that of a liquid crystal panel polarization plate 22 are arranged to be parallel to each other. As described above, in the parallel Nicols configuration, it is possible to adopt retardation members, such as a negative C plate 31 or the like, that does not cause a phase difference in a light path located in a front direction of a viewer. Also, an arrangement of the parallel Nicolas can be simplified, as compared to that of a cross Nicolas (later described).

On the other hand, in the cross Nicols configuration in which an absorption axis of the polarization plate 32 and that of the liquid crystal panel polarization plate 22 are arranged to be orthogonal to each other, the visibility limitation as described earlier can be carried out by additionally providing a λ/2 plate.

FIG. 21 shows an arrangement of a liquid crystal display device of the present invention in which the cross Nicols configuration is adopted. In this arrangement, in addition to a negative C plate 31, a λ/2 plate 33 is provided between a polarization plate 32 and a liquid crystal panel polarization plate 22. Alternatively, the λ/2 plate 33 can be provided between the polarization plate 32 and the negative C plate 31 or between the negative C plate 31 and the liquid crystal panel polarization plate 22.

An exemplary modification of the retardation member described, in Embodiments 1 through 3 can also be used in place of the negative C plate 31.

The λ/2 plate 22 gives a phase difference of λ/2 to linearly polarized light that has passed through the polarization plate 32. This rotates, by 90°, a polarized wave surface of the linearly polarized light. As such, the linearly polarized light is not optically affected by the negative C plate 31, in a light path located in a front direction of a viewer. Thus, the linearly polarized light can pass through, without being absorbed, the liquid crystal panel polarized plate 22, the liquid crystal panel polarized plate 22 and the polarized plate 32 having a relation of the cross Nicols configuration. Thus, there is no visibility limitation in the front direction of the viewer.

In contrast, retardation is set so that, with respect to a light path occurred when the liquid crystal display device is viewed in a direction at a particular polar angle φk, (i) the retardation member such as the negative C plate and (ii) the ½ plate 33, in their entirety, function as the retardation member of the present invention that carries out the visibility limitation. Thus, because of the reason described earlier, it is possible to carry out the visibility limitation in the direction at the particular polar angle φk.

Note that, it is also possible to obtain the effect of the visibility limitation, even in a case where the absorption axes of the polarization plate 32 and the liquid crystal panel polarization plate 22 are arranged to be substantially orthogonal to each other.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims. Also, an embodiment based on a proper combination of technical means disclosed in different reference embodiments is encompassed in the technical scope of the present invention.

The invention claimed is:

1. A liquid crystal display device, comprising:
   a reflective liquid crystal panel including a liquid crystal panel polarization plate;
   a polarization plate provided on a light incident side of the liquid crystal panel, with respect to the liquid crystal panel polarization plate; and
   a retardation member provided between the liquid crystal panel polarization plate and the polarization plate, a retardation of the retardation member in a light path, which light path is occurred when the liquid crystal panel is viewed in a direction at a particular polar angle φk (0°<φk<90°), being set so as to determine a direction in which a visibility limitation should be carried out.

2. The liquid crystal display device as set forth in claim 1, wherein the polarization plate has an absorption axis parallel to that of the liquid crystal panel polarization plate.

3. The liquid crystal display device as set forth in claim 2, wherein the retardation member causes a phase difference of λ/4 with respect to one way of a light path occurred when the liquid crystal panel is viewed in a direction at a set polar angle φk (0°<φk<90°).

4. The liquid crystal display device as set forth in claim 3, wherein the retardation member includes a first retardation plate whose three main refraction indexes nx, ny, and nz have a relation of nx=ny>nz, where the main refraction indexes nx, ny, and nz are refraction indexes in directions of axes x, y, and z, respectively, that are orthogonal to each other.

5. The liquid crystal display device as set forth in claim 4, wherein the absorption axis of the polarization plate and that of the liquid crystal panel polarization plate are parallel to an x-y plane correlative to the main refraction indexes nx and ny of the first retardation plate.

6. The liquid crystal display device as set forth in claim 5, wherein the absorption axis of the polarization plate and that of the liquid crystal panel polarization plate are set to be parallel to a longitudinal direction of a display screen for displaying information or parallel to be a transverse direction of the display screen.

7. The liquid crystal display device as set forth in claim 4, wherein the first retardation plate is made up of a plurality of retardation plates.

8. The liquid crystal display device as set forth in claim 7, wherein
   the plurality of the retardation plates, constituting the first retardation plate, in their entirety cause a phase difference of λ/4 with respect to one way of a light path occurred when the liquid crystal panel is viewed in a direction at a set single constant polar angle φk (0°<φk<90°.

9. The liquid crystal display device as set forth in claim 7, wherein:
   constant polar angles φk (0°<φk<90°), which are different from each other, are set to the plurality of the retardation plates constituting the first retardation plate, respectively; and
   the retardation plates cause phase differences of λ/4, respectively, with respect to one ways of light paths occurred when the liquid crystal panel is viewed in directions at the polar angles φk (0°<φk<90°).

10. The liquid crystal display device as set forth in claim 3, wherein the retardation member includes a second retardation plate whose three main refraction indexes nx, ny, and nz have a relation of nx=ny<nz, where the main refraction indexes nx, ny, and nz are refraction indexes in directions of axes x, y, and z, respectively, that are orthogonal to each other.

11. The liquid crystal display device as set forth in claim 10, wherein the second retardation plate is made up of a plurality of retardation plates.

12. The liquid crystal display device as set forth in claim 10, wherein:

a plurality of retardation plates, constituting the second retardation plate, in their entirety cause a phase difference of λ/4 with respect to one way of a light path occurred when the liquid crystal panel is viewed in a direction at a set single constant polar angle φk (0°<φk<90°).

13. The liquid crystal display device as set forth in claim 10, wherein:
constant polar angles φk (0°<φk<90°), which are different from each other, are set to a plurality of retardation plates constituting the second retardation plate, respectively; and
the retardation plates cause phase differences of λ/4, respectively, with respect to one ways of light paths occurred when the liquid crystal panel is viewed in directions at the polar angles φk (0°<φk<90°).

14. The liquid crystal display device as set forth in claim 2, wherein the retardation member includes:
a first retardation plate for causing a phase difference of λ/4 with respect to one way of a light path occurred when the liquid crystal panel is viewed in a direction at a set first polar angle φk1 (0°<φk<90°); and
a second retardation plate for causing a phase difference of λ/4 with respect to one way of a light path occurred when the liquid crystal panel is viewed in a direction at a set second polar angle φk2 (0°<φk<90°), the second polar angle φk2 being set to be different from the first polar angle φk1.

15. The liquid crystal display device as set forth in claim 2, wherein:
the retardation member is made of a third retardation plate whose three main refraction indexes nx, ny, and nz have a relation of (i) nx>ny=nz, (ii) nz=nx>ny, (iii) nx>ny>nz, (iv) nx>nz>ny, or (v) nz>nx>ny, where the refraction indexes nx, ny, and nz are refraction indexes in directions of axes x, y, and z that are orthogonal to each other; and
the third retardation plate is provided so that any one of the axes x and y is parallel to the absorption axis of the polarization plate, the third retardation plate causing a phase difference of λ/4 with respect to one way of a light path occurred when the liquid crystal panel is viewed in a direction at a set polar angle φk (0°<φk<90°).

16. The liquid crystal display device as set forth in claim 15, wherein the third retardation plate is made up of a plurality of retardation plates.

17. The liquid crystal display device as set forth in claim 15, wherein
a plurality of retardation plates, constituting the third retardation plate, in their entirety cause a phase difference of λ/4 with respect to one way of a light path occurred when the liquid crystal panel is viewed in a direction at a set single constant polar angle φk (0°<φk<90°).

18. The liquid crystal display device as set forth in claim 15, wherein:
constant polar angles φk (0°<φk<90°), which are different from each other, are set to a plurality of retardation plates constituting the third retardation plate, respectively; and
the retardation plates cause phase differences of λ/4, respectively, with respect to one ways of light paths occurred when the liquid crystal panel is viewed in directions at the polar angles φk.

19. The liquid crystal display device as set forth in claim 1, wherein:
the retardation member further includes a λ/2 plate; and
the polarization plate has an absorption axis orthogonal to that of the liquid crystal panel polarization plate.

20. The liquid crystal display device as set forth in claim 1, wherein the retardation member includes a first retardation plate whose three main refraction indexes nx, ny, and nz have a relation of nx=ny>nz or nx=ny<nz, where the main refraction indexes nx, ny, and nz are main refraction indexes in directions of axes x, y, and z that are orthogonal to each other.

21. The liquid crystal display device as set forth in claim 20, wherein the polarization plate has an absorption axis parallel to that of the liquid crystal panel polarization plate.

22. The liquid crystal display device as set forth in claim 21, wherein the retardation member causes a phase difference of λ/2 with respect to one way of a light path occurred when the liquid crystal panel is viewed in a direction at a set polar angle φk (0°<φk<90°).

23. The liquid crystal display device as set forth in claim 20, wherein the retardation member causes a phase difference of λ/4 with respect to one way of a light path occurred when the liquid crystal panel is viewed in a direction at a set polar angle φk (0°<φk<90°).

* * * * *